United States Patent [19]

Gabriel

[11] Patent Number: 4,605,183
[45] Date of Patent: Aug. 12, 1986

[54] SWING WING GLIDER

[76] Inventor: Albert L. Gabriel, 135 W. Mission Ave., Suite 211, Escondido, Calif. 92025

[21] Appl. No.: 592,348

[22] Filed: Mar. 22, 1984

[51] Int. Cl.⁴ .............................................. B64C 3/40
[52] U.S. Cl. ........................................ 244/46; 244/49; 244/91; 446/62; 446/63
[58] Field of Search ........................ 446/34, 61, 62, 63, 446/64, 65, 66; 244/3.28, 46, 49, 91

[56] References Cited

U.S. PATENT DOCUMENTS

| | | | |
|---|---|---|---|
| 2,145,972 | 2/1939 | Clark et al. | 446/63 |
| 2,700,337 | 1/1955 | Cumming | 244/3.28 |
| 2,784,524 | 3/1957 | Jackle | 446/61 |
| 3,408,767 | 11/1968 | Anderson | 446/62 |
| 3,433,210 | 3/1969 | Schnitz | 446/63 |
| 3,463,419 | 8/1969 | Rashidian | 244/46 |

FOREIGN PATENT DOCUMENTS

| | | | |
|---|---|---|---|
| 458228 | 7/1950 | Italy | 446/62 |
| 649223 | 1/1951 | United Kingdom | 446/62 |

OTHER PUBLICATIONS

"Gulfstreamer", vol. 5, No. 6, Winter 1976, Grumman American Aviation Corp.

Primary Examiner—Galen Barefoot
Attorney, Agent, or Firm—Albert L. Gabriel

[57] ABSTRACT

A glider comprising a pair of wings having overlapped forward, inner root portions that are freely pivotally connected and tailfins on rearward, outer portions of the wings. The tailfins are angularly offset from the general longitudinal axes of the wings so as to have an airfoil liftout angle of attack to the relative wind during flight which causes the wings to swing out to an extended configuration.

34 Claims, 23 Drawing Figures

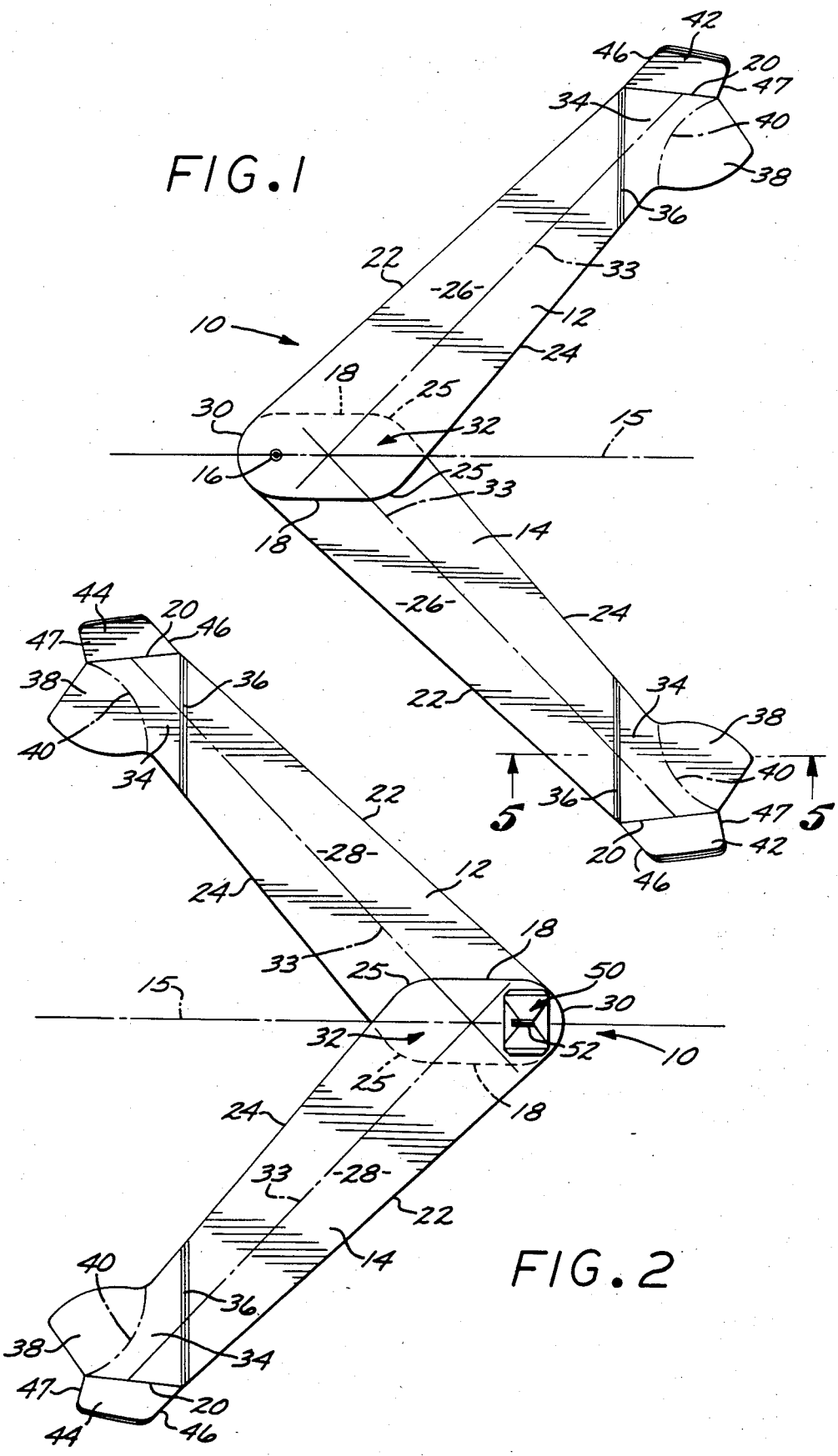

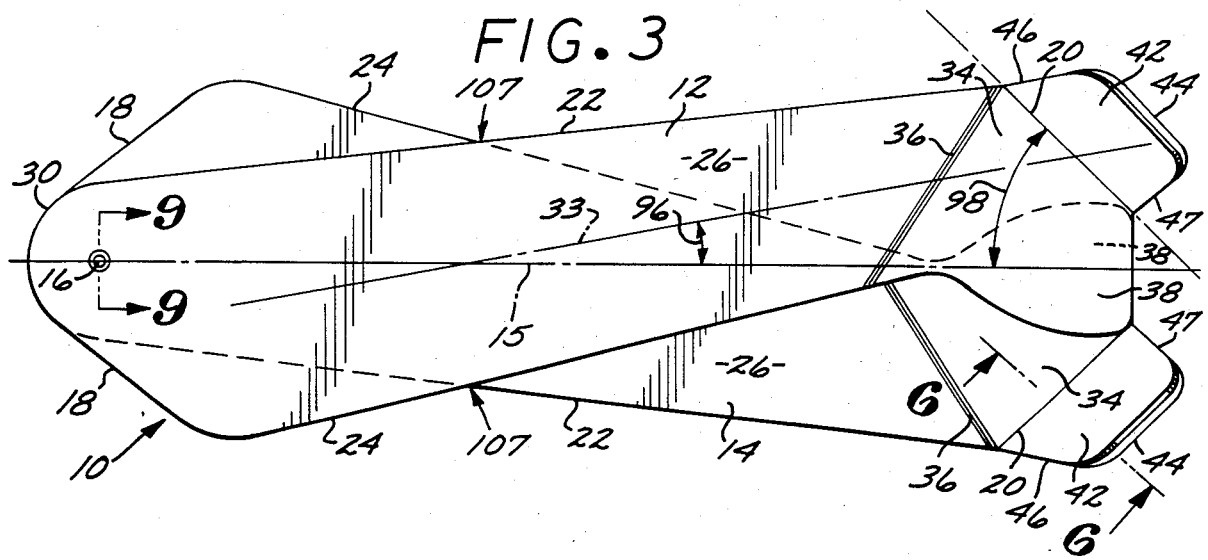
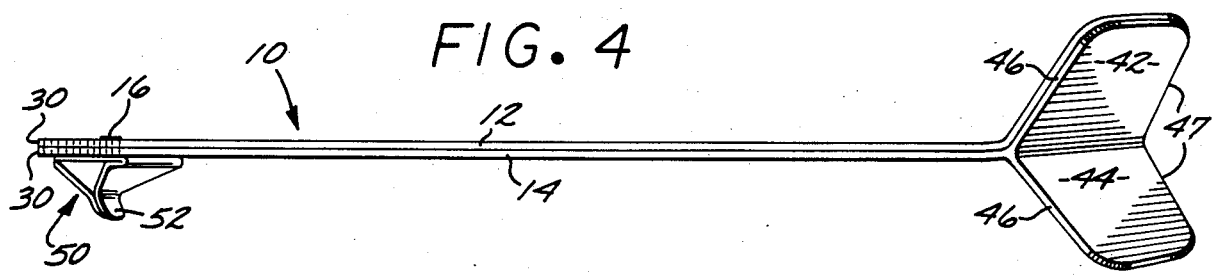
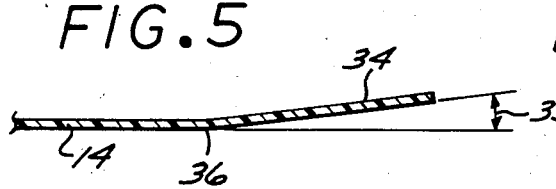
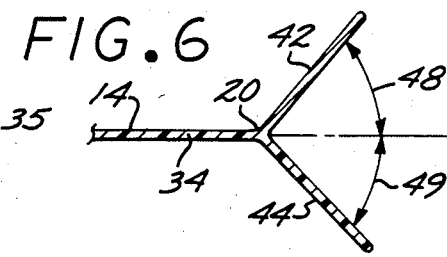
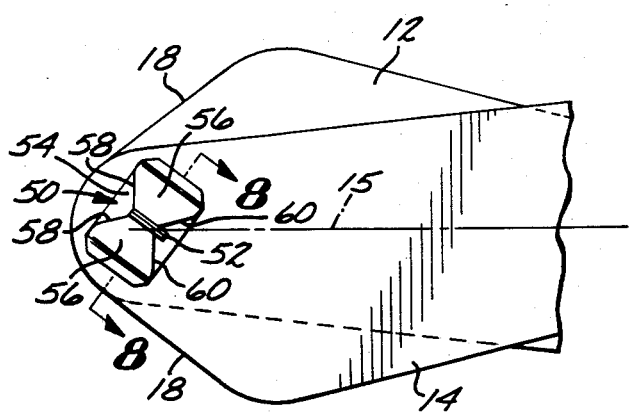
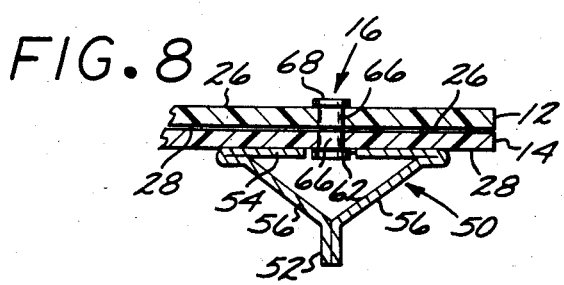
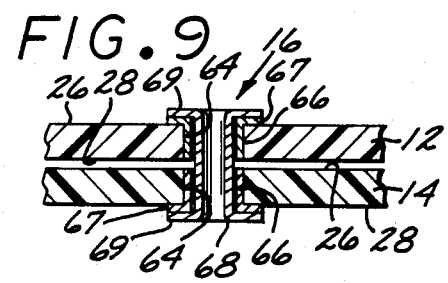

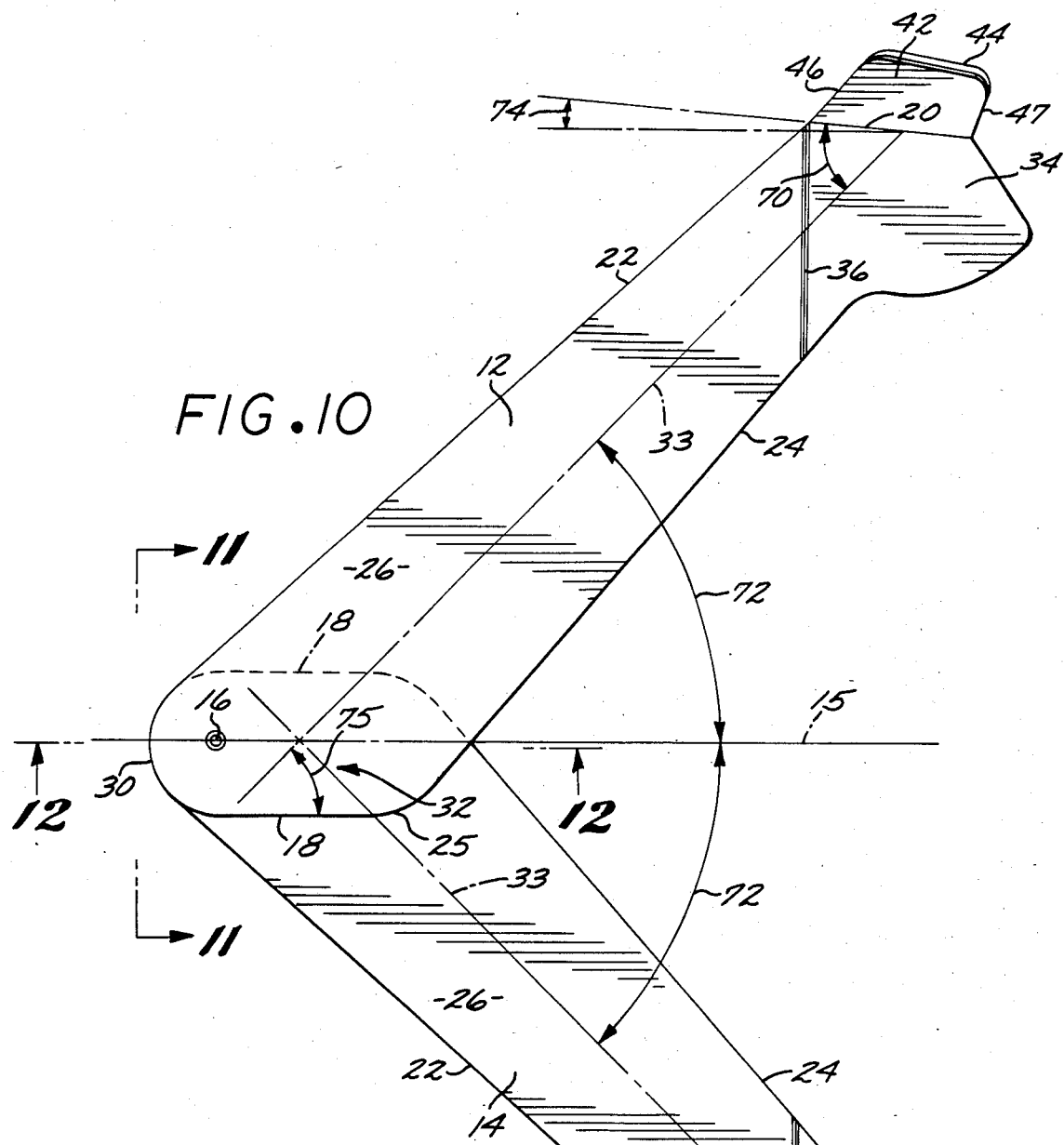

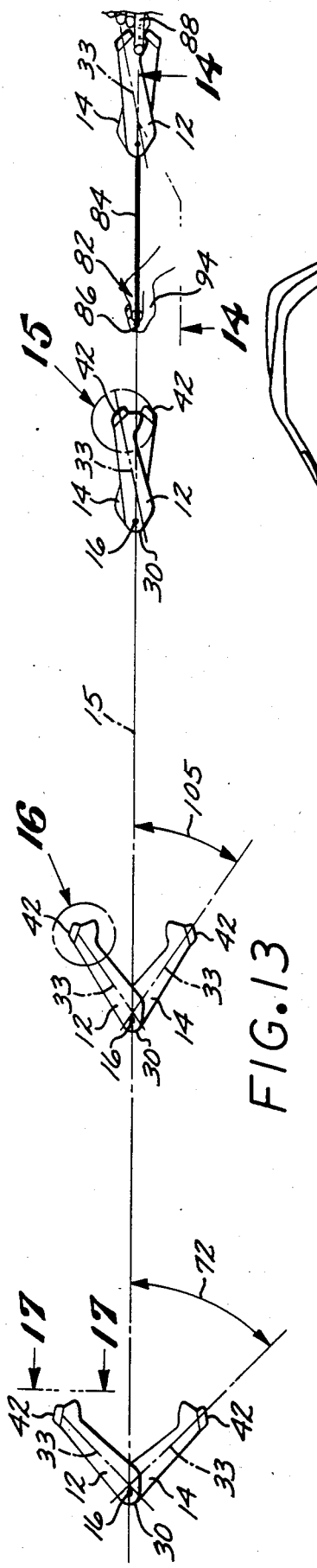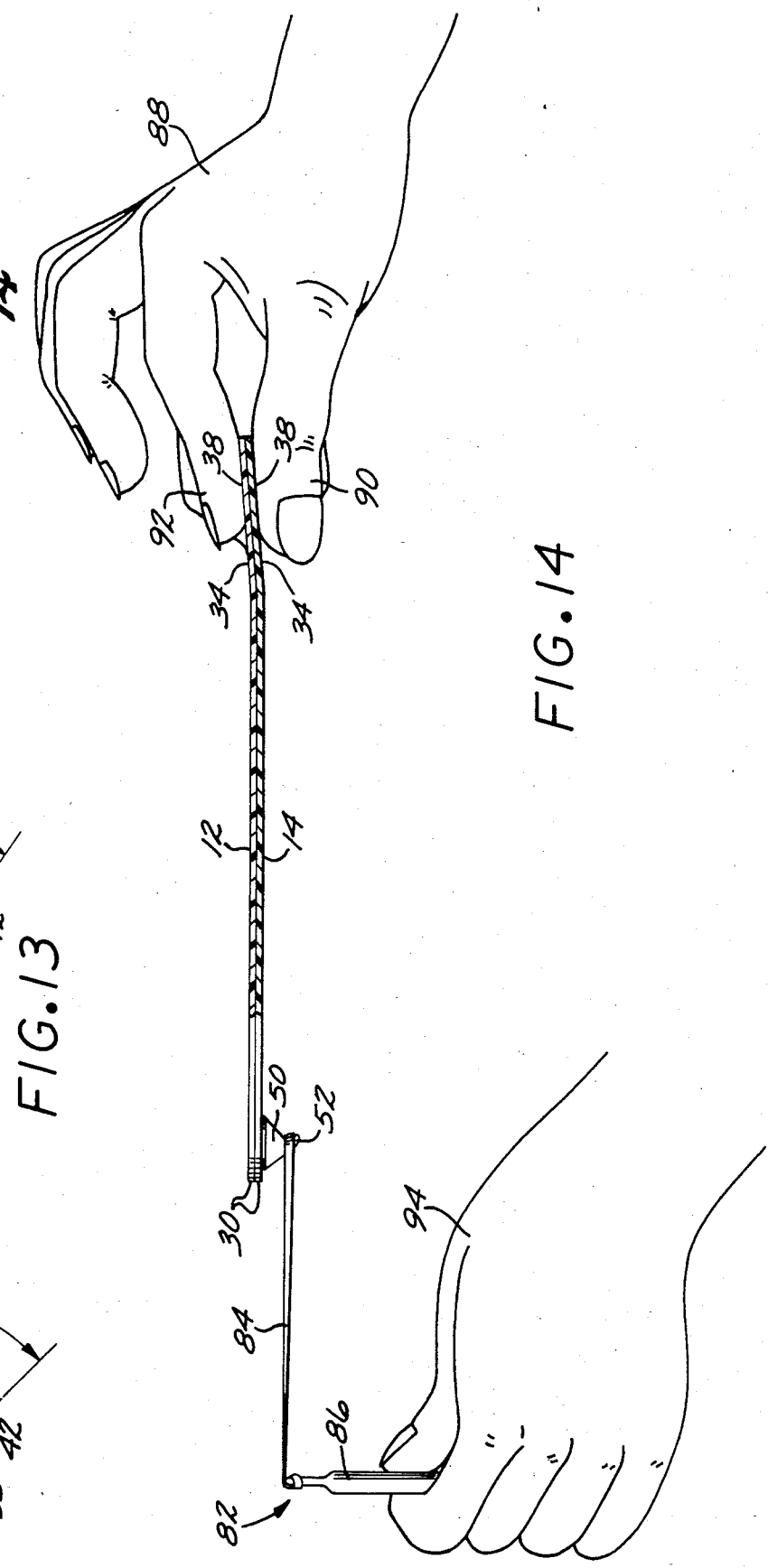

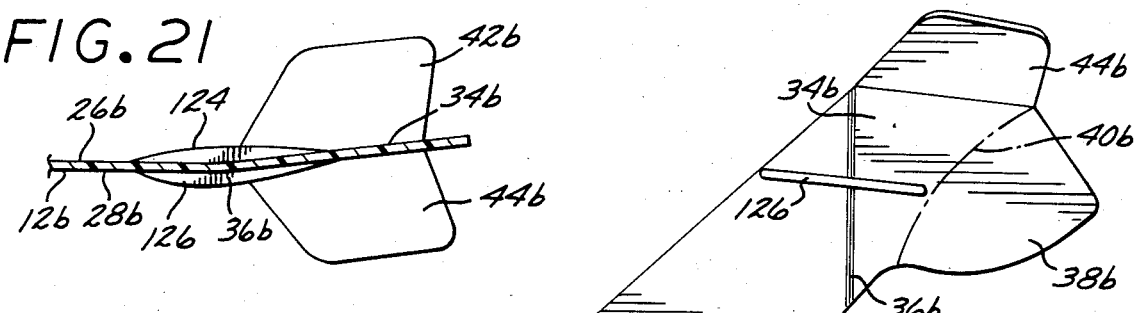
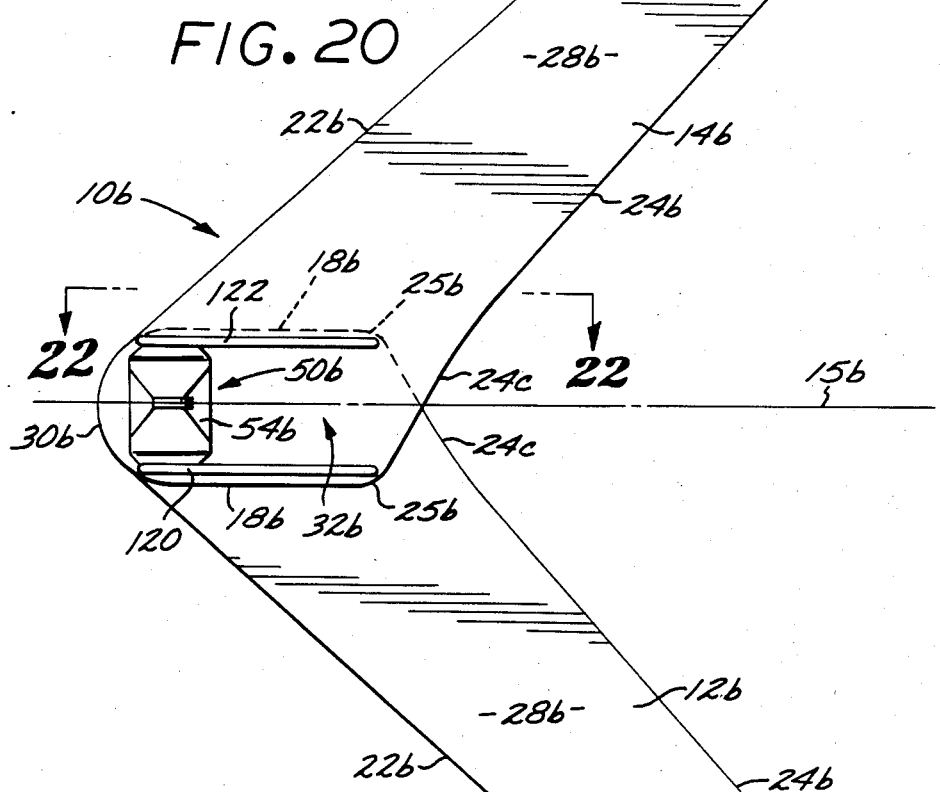
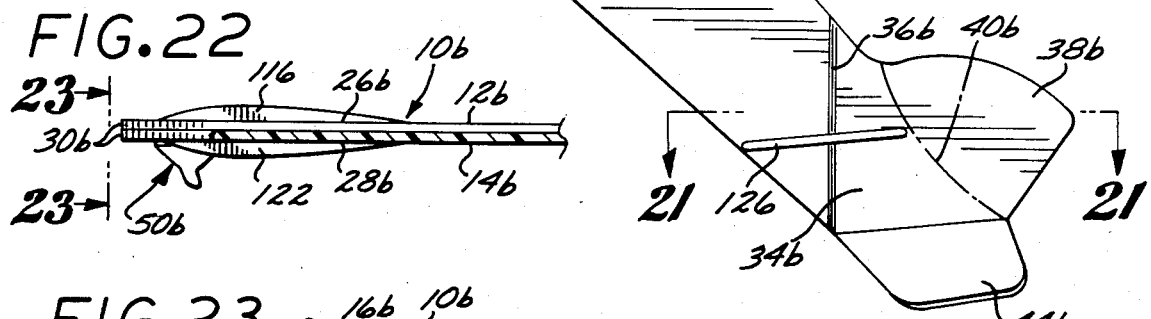
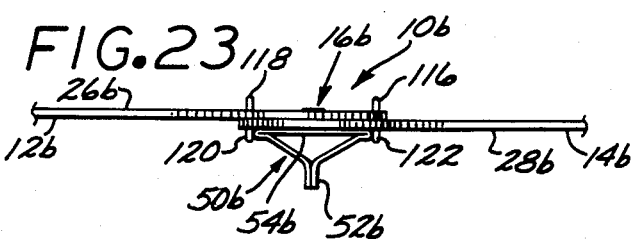

SWING WING GLIDER

BACKGROUND OF THE INVENTION

1. Field of the Invention

The invention relates to glide devices and particularly to glide plane models and toys that are either elastic-driven or hand-launched.

2. Description of the Prior Art

In the development of elastic-driven and hand-launched glide devices, of chief concern has been the problem of launching such a device in a manner so as to drive it to a desirable altitude from which it may begin a lengthy and interesting glide descent. The conventional form of the glider is of fixed-wing configuration with a fuselage which adds undesirable weight and contributes parasitic drag to the flight characteristics. This conception of a glider has proven inadequate due to the excessive lift acting on such a device at high launch speed, the high lift characteristics being required when the device slows down to its normal glide speed. The high initial speed necessary to launch a glider to a desirable glide altitude tends to drive such device into either a tight loop or a stall which makes for an undesirable flight pattern. In addition, since there is not usually a load carried by such device, the usual necessity for a fuselage in an aircraft is not present, and the added weight and parasitic drag contributed by the fuselage are unnecessary inefficiencies. Examples of such fuselage-bearing fixed-wing devices are disclosed in U.S. Pat. Nos. 1,852,807, Jacobs; 2,298,425, Shaffer; and 2,274,208, Mull. On the other hand, nongyrational flying wings bearing no fuselage have thus far been impracticable due to the problem of excessive lift at launch.

Attempts to develop a device which adjusts to both high speed launch and normal glide speed conditions have thus far been simplistic two-stage affairs. U.S. Pat. No. 2,820,322 to White discloses a device wherein a fuselage-bearing glide device has a stablizer with a sliding weight which brings the stabilizer to one of two positions for either ascent or descent. The device does not address the problem of wing lift at launch. There have been a number of glide devices developed having wings which may be pulled back along the sides of a fuselage-bearing device into a diminished lift position for either an elastic-driven or hand-hurled launch. As the maximum attainable altitude of these devices is reached and their air speed diminishes, the wing assemblies of these devices are brought back into a standard fixed-wing position by either elastic or spring-driven means. The actual glide pattern of these devices after reaching glide altitude is similar to that of a fixed-wing glider being dropped from a high altitude, there being nothing particularly novel or unexpected about their flight pattern. Once again, the added weight and parasitic drag contributed by the fuselage are undesirable inefficiencies, and additional weight and parasitic drag are contributed by the elastic or spring-driven wing-opening means. Such devices are disclosed in U.S. Pat. Nos. 2,417,267, Porter; 2,221,012, Walker; 2,078,374, Drobniewsky; 2,158,377, O'Hare; 3,408,767, Anderson; 3,369,319, Brown; 3,913,657, Leckie; and 3,839,818, Heggedal.

U.S. Pat. No. 3,222,817 to Brandstetter discloses a device wherein the wings are folded up relative to the fuselage at launch rather than being folded back, and then are pulled down by elastic means into a standard fixed-wing configuration when the device reaches its maximum height. U.S. Pat. No. 4,324,064 to Bettencourt discloses a device wherein the fuselage folds in half at launch and the wings are brought down together into a sort of rudder. The wing assembly of this device is also snapped back into a standard fixed-wing configuration by elastic means once the device has ceased its climb.

A device bearing a wing assembly which is adjustably fixed before launch and remains fixed during and after launch is disclosed in U.S. Pat. No. 3,916,560. Since it does not adjust to variance in launch and flight conditions, it offers no advantage over the problem at hand.

Devices which are ballistically driven to a desired altitude and then commence an autorotational descent are disclosed in U.S. Pat. Nos. 2,899,773, Lockwood; 2,753,657, Taggart; and 3,119,196, Alberico et al. Devices which are given a rotational impulse at launch and which consequently gyrate throughout their flight pattern are described in U.S. Pat. Nos. 2,837,077, Frazelle, and 3,559,331, Eller. Since these are rotary wing aircraft depending on gyration rather than forward air speed to develop lift, they do not constitute part of an analogous art.

Devices intended to drive an unopened parachute toy to a desirable altitude where it may then open and begin its descent are described in U.S. Pat. Nos. 3,172,231, Arland, and 2,587,699, Cotter. Again, these devices are not part of an analogous art.

Applicant is not aware of any glide device in the prior art which is capable of absorbing landing or crash impact. Consequently, all previous hand-launched glide devices have concentrated impact in such a way as to damage or destroy the device or cause damage to the object of impact, which may mean bodily harm when such a device strikes a person.

Applicant is not aware of any elastic-driven or hand-launched airplane glider device which is capable of aerodynamically adjusting to the difference between launch and glide conditions without depending upon additional spring or elastic means, or has been capable of adjusting to the varying flight conditions after glide has been established, or has been capable of absorbing the shock of impact. Applicant is aware of no elastic-driven or hand-launched glide device or flying wing wherein the relative wing geometry is not fixed at any point during flight.

SUMMARY OF THE INVENTION

In view of these and other problems in the art, it is a general object of the present invention to provide a glide device which is capable of continuously automatically adjusting to both launch and glide conditions.

It is another object of the present invention to provide a glide device which is capable of continuously automatically adjusting to both launch and glide conditions by aerodynamic means and without depending upon spring or elastic means.

It is another object of the present invention is to provide a glide device of the character described bearing no fuselage.

Another object of the present invention to provide a glide device of the character described wherein the relative wing geometry of the device is not fixed.

It is a further object of the present invention to provide a glide device of the character described which comprises chiefly the pivoted connection proximate the wing roots of two substantially bilaterally symmetrical wings.

A still further object of the present invention is to provide a glide device of the character described wherein the pivoted overlapping of root portions of two bilaterally symmetrical wings constitutes the glider nose.

Yet another object of the present invention is to provide a glide device of the character described wherein the symmetrical wings are capable of freely swinging about a pivot Another object of the present invention is to provide a glide device of the character described wherein the symmetrical wings bear tailfin means which automatically aerodynamically motivate the wings to angularly adjust relative to each other about the pivot in order to suit flight conditions.

Another object of the present invention is to provide a glide device of the character described which constantly aerodynamically seeks to adjust to a best glide wing configuration and best glide speed.

Yet another object of the present invention is to provide a glide device of the character described wherein wing adjustments made by the glider are enabled by the efficient utilization of lift/drag characteristics of airfoil members.

Another object of the present invention is to provide a glide device of the character described which is capable of yielding to an object struck by the glide device during flight thereby causing little or no damage to either the glide device or the object struck.

Another object of the present invention is to provide a glide device of the character described which is capable of dissipating the energy of impact of the glider upon striking an object or person over both a large surface area and an extended interval of time, thereby causing minimal trauma to either the glider or the object or person impacted.

The present invention is a glide device which is particularly adapted to be elastic band power-launched, but may alternatively be hand-launched, the glide device comprising the pivoted conjunction of two bilaterally symmetrical wings, each having an empenage consisting of an elevator forming an extension of the wing, a lower tailfin, and preferably also an upper tailfin. A launching projection depends from the lower of the two wings, and may be a part of the pivoted connection. For a powered launch the wings are folded together in a closed or collapsed configuration of the glider wherein overlapped finger grip tabs which form extensions of the elevators are gripped between the thumb and forefinger of one hand, while the other hand holds a launching device preferably comprising a rubber band that is engaged with the launching projection and tensioned. At launch the elevator finger grip tabs are released and after the glider has been accelerated to launch speed by the elastic band and has traveled a few feet, the wings are automatically swung outwardly by aerodynamic liftout forces operating upon the vertical components of the tailfins. The initial swingout angle of the wings at the high speed launch mode, subsequent automatic wing outward adjustments as the glider slows down, and then continuous pivotal wing adjustments seeking stabilization at best glide speed and configuration, are all surprising new results that are produced aerodynamically by completely new modes of operation in the art in response to variations in the ratio of swingout or liftout forces on the vertical tailfin components relative to the summation of the drag forces on all airfoil members of the swing wing glider.

The swing wing glider of the present invention has its maximum liftout-to-drag ratio and maximum wing extension at the best glide speed, and it is this characteristic that is utilized to produce the continuous, automatic wing adjustment. Whenever the glide speed is other than "best glide speed", either on the high speed or low speed side, the liftout/drag ratio decreases, which results in the wings pivoting toward a relatively more closed position because of the relatively greater influence of drag. On the high speed side of best glide speed, which is normally the condition for the first portion of a flight after launch, but may also be caused by a downdraft or when the glider comes down out of a loop, this relative closing of the wings adjusts them to a more dart-like shape that produces less lift and therefore produces a more extended and efficient early part of the flight; then as drag and/or climb reduces the speed and thereby increases the liftout/drag ratio, the wings are enabled to progressively automatically swing outwardly until they reach their best glide speed configuration at the maximum liftout/drag ratio. Conversely, on the low speed side of best glide speed, which may occur if the glider is launched so as to approach a stall, or because of an updraft, the relative closing of the wings decreases overall wing lift, causing the nose of the glider to drop, which in turn allows the speed to come back up to best glide speed. This automatic wing adjustment is continuous so as to maintain the glider proximate its best glide speed configuration and best glide speed and goes on until flight is ended by landing or by collision.

By providing a loose pivotal connection between the two overlapping wings of the swing wing glider of the invention, a flight-stabilizing dihedral deflection between the wings is enabled. While one would expect the loose pivot to cause the wing geometry to become unstable in flight, the dihedral deflection opens up a slot between the overlapping wing root portions that enables the Bernoulli principle to operate in a new way in the art by reduced pressure at the trailing wing root edges accelerating a flow of air through the slot, with the resulting Bernoulli partial vacuum between the wings surprisingly stabilizing the front-rear wing geometry.

Another surprising new result of the pivoted wing construction of the swing wing glider of the invention is that a fuselage can be completely eliminated, and the resulting reduction in weight and almost complete elimination of parasitic drag result in a surprising reduction of the sink rate and corresponding increase in flight time.

Another surprising new result of the pivoted wing construction of the swing wing glider of the invention is that the energy of any impact with the ground, a person, or any object at the end of the flight, is dissipated with minimal trauma to the swing wing glider or to the person or object impacted, since the wings swing forward around the pivoted connection, spreading the impact force along the entire body of the glider and also along the period of time it takes the wings to absorb the shock.

A further surprising new result of the pivoted wing construction of the swing wing glider of the invention is that the glider is foldable into a narrow, compact, strengthened form for carrying or stowing, so that it is much less likely to be damaged under those circumstances than conventional fixed-wing gliders.

A still further surprising new result of the pivoted wing construction and automatic tailfin actuation of the swing wing glider of the invention is that it is a true "action" toy in which the action takes place throughout the full extent of each flight, making the swing wing glider truly exciting to watch during flight.

These and other objects of the present invention will become clear in the following description as taken in conjunction with the drawings.

BRIEF DESCRIPTION OF THE DRAWINGS

FIG. 1 is a top plan view showing the swing wing glider of the present invention with its wings opened to their best glide speed configuration.

FIG. 2 is a bottom plan view of the swing wing glider of the invention with the wings in the same configuration as in FIG. 1.

FIG. 3 is a top plan view showing the swing wing glider of the invention with the wings collapsed or folded, broken lines indicating overlapping portions.

FIG. 4 is a side elevational view of the swing wing glider of the invention with the wings folded.

FIG. 5 is a fragmentary vertical sectional view taken on the line 5—5 in FIG. 1 showing elevator deflection relative to its respective wing.

FIG. 6 is a fragmentary vertical sectional view taken on line 6—6 in FIG. 3 showing angular relationships between the upper and lower tailfins and their respective elevator.

FIG. 7 is a fragmentary bottom plan view of the glider of the invention with the wings closed as in FIG. 3, showing the launching projection and its orientation on the lower wing.

FIG. 8 is an enlarged, fragmentary vertical section, with portions in elevation, taken on line 8—8 in FIG. 7 showing details of the wing pivot and the launching projection.

FIG. 9 is a further enlarged, fragmentary vertical section similar to FIG. 8, but with the launching projection omitted for clarity, and showing internal details of the pivot.

FIG. 10 is a top plan view of the swing wing glider of the invention in its extended, best glide configuration showing angular relationships, including the angle of offset of the vertical tailfin components from the longitudinal axes of their respective wings, the swingout angle of each wing from the longitudinal axis of the glider, the angle of attack of the vertical tailfin components to the relative wind, and the angle that each root wing edge is offset from its respective wing axis.

FIG. 11 is a fragmentary elevational view taken on the line 11—11 in FIG. 10, with the launching projection omitted for clarity, showing dihedral deflection between the wings.

FIG. 12 is an enlarged, fragmentary vertical axial sectional view with portions shown in elevation taken on line 12—12 in FIG. 10, illustrating axially directed airflow above, below, and through overlapping root portions of the glider wings during flight.

FIG. 13 is a top plan view showing the swing wing glider of the present invention being launched and at several sequential points along its flight path shortly after launch.

FIG. 14 is a side elevational view, partially in vertical section, taken on line 14—14 in FIG. 13, illustrating the manner in which the swing wing glider is grasped between the fingers and an elastic band is engaged with the launching projection preparatory to launch.

FIG. 20 is a bottom plan view of a third form of the swing wing glider of the present invention which embodies stiffening ribs and has a high aspect ratio wing plan form.

FIG. 21 is a fragmentary vertical section, with portions shown in elevation, taken on line 21—21 in FIG. 20.

FIG. 22 is a fragmentary vertical section, with portions shown in elevation, taken on line 22—22 in FIG. 20.

FIG. 23 is a fragmentary front elevational view taken on line 23—23 in FIG. 22.

DETAILED DESCRIPTION

Figure 15:
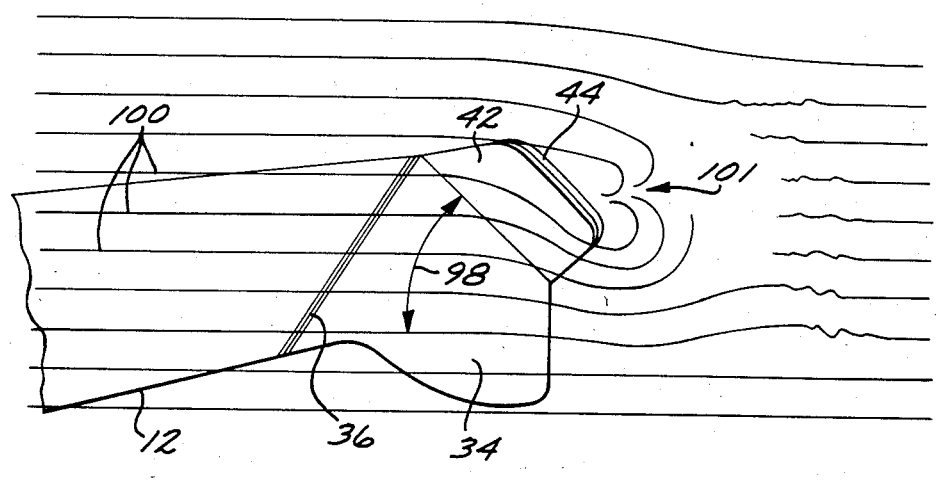
FIG. 15 is an enlarged, fragmentary top plan view of the encircled region designated 15 in FIG. 13, with lines illustrating airstreaming around the tailfins immediately following launch of the swing wing glider and before the wings have substantially opened.

Referring to the drawings, and at first particularly to FIGS. 1 to 6 thereof, a first form of the swing wing glider of the present invention is generally designated 10, and is comprised of a pair of overlapping, freely pivotally connected wings that are opened out to an angular "flying wing" configuration in normal flight, as seen in FIGS. 1 and 2. Thus, the swing wing glider 10 includes an upper wing 12 and a lower wing 14 which are of identical plan form and are freely pivotally connected by means of a pivot 16 at identical locations on their plan forms near their inner or central ends, and also near the front or nose end of the glider 10. In the top and bottom plan views of FIGS. 1 and 2, respectively, the wings 12 and 14 are shown opened out to their best glide speed configuration, which may be considered as the normal flight configuration of the glider 10, and which is the maximum angular and wingspread extension of the wings 12 and 14 during flight. At this best glide speed configuration the swing wing glider 10 has its maximum lift/drag ratio, flies with its minimum descent angle and sink rate, and will accordingly glide the maximum possible horizontal distance.

The wings 12 and 14 are bilaterally symmetrical about the longitudinal axis of the glider 10 for all relative positions of the wings 12 and 14, the longitudinal axis of glider 10 being indicated by the phantom line 15 in FIGS. 1, 2, 3, 7, 10 and 13. The longitudinal axis 15 of swing wing glider 10 will, under all flight conditions and in all relative positions of the wings 12 and 14, automatically align itself with the relative wind, so that the phantom line 15 indicates both the longitudinal axis of the glider 10 and the direction of the relative wind.

The wings 12 and 14, and also the elevators and tailfins described below, are preferably made of flat sheet stock of a low density material such as balsa wood or any plastic material that will foam and be moldable or otherwise formable into a substantially rigid structure. Examples of suitable plastic materials are foam polystyrene and foam polyurethane. Such plastic materials may be of the self-skinning type when molded or otherwise formed, or may be skinned after having been molded or otherwise formed. Alternatively, the low density material may be constituted of sintered foam microbeads of any suitable plastic material such as polystyrene or polyurethane.

In the present description terms such as upper, lower, top, bottom, inner or inwardly, or central, and outer or outwardly are employed for convenience of reference and not by way of limitation. In using the terms upper, lower, top and bottom, the glider 10 will be assumed to be oriented upright and generally parallel to the ground. The terms inner or inwardly or center or central are defined to mean toward or proximate the longitudinal axis 15 of the glider 10; whereas such terms as out, outer and outwardly are defined to mean laterally away from the longitudinal axis 15 and toward the wing tips.

Each of the symmetrical wings 12 and 14 has a straight inner edge 18, and a straight outer edge 20 which constitutes the wing tip and which is actually on the elevator extension of the respective wing. Each wing 12 and 14 is further defined between a leading edge 22 and a trailing edge 24, the trailing edge 24 joining the inner edge at a rounded heel 25. The leading edge 22 and trailing edge 24 of each wing are preferably substantially straight, and define between them a wing plan which is tapered from a relatively longer chord proximate the central longitudinal axis 15 down to a relatively shorter chord outwardly toward the wing tips. The wing plan is so tapered for several reasons. First, it enables a relatively long chord to be provided in the region of the overlap between the top wing 12 and bottom wing 14, and thus enables a relatively long, straight inner edge 18 of upper wing 12 to be provided for stability of the relative geometry between the wings 12 and 14 during flight, as described in detail hereinafter. Second, the tapered wing plan enables the outer portions of the wings to be relatively thin in the chordal direction, and hence to have a relatively high aspect ratio with its corresponding high lift/drag ratio. Third, this tapered wing plan form with decreasing chord length toward the wing tips minimizes outboard inertial mass of the wings that might otherwise tend to cause the wings to swing outwardly after launch beyond the optimum wing extension for the particular launch flight velocity, possibly even causing the glider 10 to stall. This minimization of outboard inertia of the wings enables damping factors to prevail so that after launch when the wings initially swing partly open to a high speed configuration they will only swing out to the correct extension for that speed without "hunting". Such damping factors and avoidance of hunting are described further hereinafter in the detailed description of the operation of the swing wing glider 10.

The term "chord" as used herein with reference to the wings is defined to mean the length between the leading edge 22 and trailing edge 24 of each wing along lines parallel to the longitudinal axis 15 with the wings 12 and 14 in their best glide speed configuration as illustrated in FIGS. 1 and 2. Such chord lines are thus aligned with the direction of the relative wind for the normal or best glide speed operating condition of the swing wing glider 10.

Each of the wings 12 and 14 has a top surface 26 and a bottom surface 28. The nose 30 of each wing 12 and 14 is preferably an arc of a circle having the pivot 16 at its center, this arc of nose 30 extending between tangential relationships with the inner edge 18 and the leading edge 22 of each wing. The arcuate noses 30 are in overlapping registry from the fully closed or collapsed configuration of FIG. 3 to the fully opened, best glide speed configuration of FIGS. 1 and 2, the noses 30 together providing a symmetrical, arcuate nose for the glider 10 itself.

It is preferred that the pivot 16 be close to the arcuate noses 30 of wings 12 and 14 to obtain the maximum aerodynamically useful wing lengths relative to the actual physical lengths of the wings. Also, the appearance of the glider is better with the pivot 16 set close to the arcuate noses 30 rather than being set rearwardly along the wing chords. The farther rearward the pivot 16 is set along the chords, the greater the radiuses of the arcs of noses 30 that are required to keep the arcuate noses 30 in registry through the full range of operative movement of the wings; thus, the farther back the pivot 16 is set on the wing chords, the more blunt the arcuate noses 30 are, which detracts from the appearance of glider 10. By way of example only, and not of limitation, in gliders 10 having the length of each wing approximately 9–10 inches, a satisfactory location for the axis of pivot 16 is approximately five-eighths inch from the arcuate noses 30.

The straight inner edge 18 of each wing 12 and 14 is oriented in the wing chord direction as defined above; i.e., is parallel to the longitudinal axis 15 of the glider 10 in the best glide speed configuration of glider 10, as shown in FIGS. 1 and 2. This is more important for the inner edge 18 of upper wing 12 than for inner edge 18 of lower wing 14 in order to provide reliable, uncocked bilateral geometry of the two wings in flight while nevertheless enabling a quite loose pivot 16 to be employed for complete freedom of relative swinging movement between the wings and to enable a flight-stabilizing dihedral to be developed, as described hereinafter in connection with the detailed description of the operation of glider 10.

The wings 12 and 14 have overlapped root portions generally designated 32 which, in all flying configurations of the wings 12 and 14, are defined laterally between inner wing edges 18, and longitudinally between noses 30 at the front and trailing wing edges 24 and heels 25 at the rear, the overlapped root portions 32 thus having a generally longitudinally oriented oval configuration. As seen in FIGS. 1 and 2, in the best glide speed configuration the side edges 18 of the overlapped root portions 32 are parallel to each other and to the longitudinal axis 15. A phantom line 33 designates the general longitudinal axis of each of the wings 12 and 14 (as distinguished from the longitudinal axis 15 of the glider 10). Prototypes of the swing wing glider 10 wherein the included angle between the wing axes 33 at best glide configuration is approximately 90° have had optimal flight characteristics.

An elevator 34 forms an integral rearward extension of each wing 12 and 14 proximate the outer end of the wing, the elevators 34 defining the wing tips or straight outer edges 20 of the wings. Each elevator 34 is bent or deflected upwardly and rearwardly from the general plane of its respective wing at a substantially transversely-oriented bend line 36. The angle of deflection of each of the elevators 34 is designated 35, as best seen in FIG. 5, and provides negative lift at the rear end of glider 10 that is balanced against the amount of weight carried proximate the nose of glider 10 so as to establish the best glide speed for glider 10. Thus, if a larger amount of noseweight is employed, a larger elevator deflection angle 35 is required; while conversely, if a smaller amount of noseweight is employed, a smaller elevator deflection angle 35 will be required. A series of experimental prototypes has indicated that a satisfactory range for the deflection angle 35 of each elevator 34 above the general plane of its respective wing is from approximately 4° to approximately 10°, with a preferred elevator deflection angle 35 of approximately 7°; the noseweight being adjusted according to the selected elevator deflection angle 35 to provide the glider 10 with its best possible glide speed.

Inasmuch as the elevators 34 are located outboard on the wings 12 and 14, they are in positions where they will automatically function not only as elevators but also as ailerons. Accordingly, in order to avoid aileron-induced roll about the longitudinal axis 15 of glider 10, it is essential that the two elevators 34 have substantially the same angle 35 of deflection above the general planes of their respective wings 12 and 14.

Rearward, inward portions 38 of elevators 34 overlap each other so as to form finger grip tabs in the closed, launching configuration of glider 10, as illustrated in FIG. 3. Phantom lines 40 have been added to the elevators 34 in FIGS. 1 and 2 to indicate the regions of these overlap finger grip tabs 38. It will thus be appreciated that the elevators 34 serve the dual functions of providing negative lift proximate the rear end of the glider 10 which counterbalances the noseweight of glider 10, and serving also as gripping members by which the glider 10 is held when it is being launched by an elastic launching device.

An upper tailfin 42 and a lower tailfin 44 each extend from rigid connections with the respective elevators 34 proximate and preferably in line with the respective straight outer wing edges or wing tips 20. The tailfins 42 and 44 are preferably made of the same low-density flat stock as the wings 12 and 14 and their respective elevators 34, and the upper tailfins 42 preferably have the same shapes or plan forms as the lower tailfins 44. The leading edges 46 of tailfins 42 and 44 are inclined rearwardly from their roots proximate wing tips 20 to their free edges so that each of these leading edges 46 will serve as a deflection ramp should it collide with some object during launch or flight. Thus, if one or both of the lower tailfins 44 should accidentally contact the launching device or the hand holding it during launch, the incline of the leading edge or edges 46 will simply deflect the rear end of the glider 10 away from the launching device or hand that is encountered without hurting the glider 10 or the object encountered, and even allowing the glider 10 to proceed with a substantially normal flight. Thus, the inclines of the leading edges 46 of tailfins 42 and 44 minimize trauma to both the tailfins and any object which they may strike. The trailing edges 47 of both the upper tailfins 42 and the lower tailfins 44 preferably extend outwardly at approximately right angles to the straight outer edges 20 of the wings.

Figure 17:
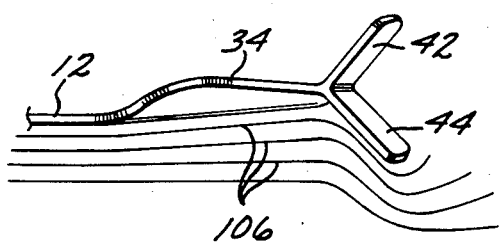
FIG. 17 is a fragmentary rear elevational view taken on line 17—17 in FIG. 13 showing the outflow of air from underneath one of the wings which cooperates with tailfin lift-out airfoil action to swing the wing all of the way out to its best glide speed position.

Preferably each of the upper tailfins 42 angles upwardly and outwardly from its root or connection with its respective elevator 34 at an angle 48 relative to the general plane of the respective elevator 34, as best seen in FIG. 6. Similarly, each of the lower tailfins 44 angles downwardly and outwardly from its root or connection with its respective elevator 34 at an angle 49 relative to the general plane of the respective elevator 34, also as best seen in FIG. 6. It is preferred that both top tailfins 42 and bottom tailfins 44 be provided, although the bottom tailfins 44 are more important than the top tailfins 42 in the automatic aerodynamically-actuated wing pivoting operation of the present invention. As described below in the detailed description of the operation of the swing wing glider 10 and particularly in connection with FIG. 17, the bottom tailfins 44 function in part by utilization of underwing outwash of air in swinging the wings 12 and 14 all of the way out to their best glide configuration of FIGS. 1 and 2, which is a configuration wherein all of the tailfins 42 and 44 have a smaller frontal silhouette, i.e., a smaller angle of attack to the relative wind, than could be achieved entirely by airfoil liftout of the vertical components of tailfins 42 and 44, thereby minimizing both profile drag and liftout induced drag of the vertical tailfin components. Nevertheless, it is not desirable that the bottom tailfins 44 extend too far downwardly from their roots or connections with the elevators 34, because the further down they extend, the more likely they are to come into contact with the elastic launching device or the hand holding such a device. Accordingly, it is desirable to also provide the upper tailfins 42 in addition to the lower tailfins 44 so as to assure that there be a sufficient amount of overall tailfin vertical component surface area to produce optimum automatic aerodynamically-actuated wing pivoting to initially swing the wings open and then to accommodate various flight conditions.

It is preferred that the bottom tailfins 44 angle or toe outwardly at an angle of inclination 49, as shown in FIG. 6, so that in the closed or collapsed launching configuration of FIGS. 3 and 4 the lower tailfins 44 will incline or angle rearwardly for avoidance of the launching device and the hand holding it as the lower tailfins 44 pass by such device and hand during launch. In the closed launching configuration of FIGS. 3 and 4 the lower tailfin toe-out angle of inclination 49 and the elevator upward deflection angle 35 will be generally additive for inclining the lower tailfins 44 out of the way of the launching device and launching hand. The angle of inclination 49 of lower tailfins 44 is also generally additive to the upward and rearward inclination of the leading edges 46 of lower tailfins 44 to further aid in deflection of the lower tailfins 44 off of the launching device or launching hand in the event of an inadvertent impact. Additionally, the toe-out inclination angle 49 of lower tailfins 44 causes the trailing edges 47 of lower tailfins 44 to similarly toe out so as to provide increased transverse clearance for the launching device and launching hand as the lower tailfins 44 pass by them during launch. While it is not as important for the upper tailfins 42 to incline outwardly at an angle of inclination 48, it is preferred that the upper tailfins 42 have such an inclination primarily for a balanced appearance relative to the lower tailfins 44, but also to provide better deflection of the upper tailfins in the event they should impact some object.

Functionally, the tailfins 42 and 44 must be considered as having orthogonal components. Thus, each of the tailfins 42 and 44 has an elevator component that is parallel to the respective elevator 34 to which it is attached and serves as a supplemental part of that elevator; and a vertical stabilizer component which prevents yaw during flight and, more importantly, functions to swing the wings 12 and 14 outwardly from their closed launch configuration of FIGS. 3 and 4 to their open normal flying configuration of FIGS. 1 and 2, and to provide automatic, substantially instantaneous adjustment of the wing extension angle in response to speeds both above and below best glide speed. Since such automatic adjustments are produced in response to variations in the ratio of swingout or liftout forces on the vertical components of the tailfins 42 and 44 relative to the summation of the drag forces on all airfoil members of glider 10, by locating the tailfins 42 and 44 at the extreme tips 20 of the wings 12 and 14, the tailfins have the longest possible lever arm about pivot 16 for their vertical components to perform the liftout or swingout function. Similarly, the drag forces on the tailfins are located at the maximum possible lever arm position, and hence are the most effective of the drag forces in the liftout/drag adjustment of the wing extension. It is to be noted that the outward inclines of the tailfins 42 and 44 from the elevators 34, as best seen in FIG. 6, effectively extend these liftout and drag lever arms of the tailfins 42 and 44 outboard from the wing tips 20 approximately half the lengths of the tailfin components that are in the direction of the elevators 34, as viewed in FIG. 6.

The terms "lift" and "drag" as employed herein are hereby defined as being perpendicular and parallel to the relative wind, respectively.

While it will be appreciated from the foregoing that it is preferred to have the tailfins 42 and 44 angle outwardly from their respective elevators 34, it is the vertical components of tailfins 42 and 44 which are critical to the liftout or swingout function of the tailfins 42 and 44 and to the automatic liftout/drag wing adjustment to accommodate varying flight conditions. In order to provide adequate vertical tailfin components for these functions without having an undesirably large amount of tailfin inertial mass, it is desirable to have each of the angles 48 and 49 of inclination of the tailfins 42 and 44, respectively, from the general planes of the elevators 34 be at least approximately 40°, and preferably at least approximately 45°. Prototypes wherein the angle of inclination 48 of upper tailfins 42 is approximately 50° and the angle of inclination 49 of the lower tailfins 44 is approximately 45° have excellent flight characteristics.

FIGS. 7, 8 and 9 show details of a presently preferred form of launching projection generally designated 50, and also of a presently preferred construction of the pivot 16. The launching projection 50 is rigidly attached to the bottom surface 28 of lower wing 14, projecting downwardly from the lower wing 14 and terminating in a generally rearwardly opening launching hook 52 that is preferably substantially vertically aligned with the axis of pivot 16. The launching projection 50 is generally pyramidal in form when viewed from the bottom as in FIG. 7, but it is an open-ended tube having its tubular axis arranged parallel to the straight inner edge 18 of lower wing 14, and hence aligned with the longitudinal axis 15 of the glider 10 when the glider 10 is in its best glide speed configuration as best seen in FIG. 2 so as to present a minimum cross-sectional profile to the relative wind in flight, with a corresponding minimum profile drag.

The launching projection 50, as shown in FIGS. 7 and 8 and as employed on several experimental prototypes, is formed of sheet aluminum, and together with the pivot 16 provides the correct amount of noseweight for a glider 10 shaped as shown in FIGS. 1–3 with an elevator deflection angle 35 of 7° for perfect balance to produce an optimum glide speed. The launching projection 50 may alternatively be made of extruded aluminum or other metal, or of a rigid molded or extruded plastic such as polystyrene or polyurethane.

Considering the launching projection 50 as viewed in FIG. 2 with the glider 10 in its normal flying configuration, the launching projection 50 includes a flat base 54 which is rigidly bonded to the bottom surface 28 of lower wing 14, a pair of generally triangular sides 56 which emerge from crimped edges of the base 54 and extend downwardly and inwardly, coming together at lowermost portions which form the launching hook 52. The leading edges 58 of sides 56 are inclined downwardly and rearwardly as cam ramps, and such incline is carried into the launching hook 52; while the trailing edges 60 of sides 56 are inclined downwardly and forwardly, also as cam ramps. A central aperture 62 is provided in the flat base 54 to provide clearance for the rivet portion of pivot 16, as seen in FIG. 8.

The camming or ramping actions enabled by the inclines of the leading and trailing edges 58 and 60, respectively, of launching projection sides 56, as well as by the downwardly and rearwardly inclined forward edge of launching hook 52, are as follows: at launch, when the swing wing glider 10 is in its closed or collapsed condition as shown in FIG. 7, one of the leading side edges 58 extends forwardly from the launching hook 52 generally in line with the longitudinal axis 15, while one of the trailing side edges 60 extends rearwardly from the launching hook 52 also generally in line with the longitudinal axis 15. This generally axially-aligned trailing edge 60 simplifies the act of engaging the elastic band of the launching device with the launching hook 52 by enabling the elastic band to be simply layed over the launching projection 50 onto the bottom surface 18 of lower wing 14 with the glider 10 generally inverted as seen in FIG. 7, and then by simply moving the elastic band forward it will be ramped by this trailing edge 60 up into engagement with the launching hook 52, while the other trailing edge 60 will assist in this ramping action. Then, after stretching the band, when the glider 10 is released to be launched, the generally axially-aligned leading edge 58 and continuing leading incline of launching hook 52 provide positive downward ejection of the elastic band as the launching projection 50 moves past the elastic band during launch. The glider 10 will normally land upright with the wings fully extended as shown in FIGS. 1 and 2, with the launching projection 50 the first part of glider 10 to engage the ground. The inclined leading edges 58 of sides 56, and the continuation of the incline onto the launching hook 52, provide an efficient forward landing skid for the glider 10 that will not tend to catch on ground irregularities. This will then allow the rear portion of glider 10 to settle down onto the ground during landings so that the landings will be completed in a "three point" attitude with the glider 10 supported by the launching projection 50 at the front and by the lower, outer edges of lower tailfins 44 at the rear, and the glider will not tend to flip over upon landing.

As seen in FIGS. 4 and 7, in the closed or collapsed launching configuration of the glider 10, the launching hook 52 is angularly offset from the longitudinal axis 15 of glider 10. This is necessitated where the launching projection 50 is affixed to the lower wing 14 in order that the axis of the launching projection 50, including that of the launching hook 52, be aligned with the axis 15 of the glider and with the direction of the relative wind to minimize profile drag when the glider 10 is opened to its best glide speed configuration as shown in FIGS. 1 and 2.

By having the rearward, launching part of the launching hook 52 substantially vertically axially-aligned with the pivot 16, and having the loose pivot, equal launch force is applied to both wings at the pivot axis, which avoids any biasing of the launch force toward one wing, and avoids any rotational opening or closing torque being applied to either wing at launch.

FIGS. 8 and 9 illustrate a presently preferred construction for the pivot 16. A pivot hole 64 extends through each of the wings 12 and 14 between its upper and lower surfaces 26 and 28, respectively. To assure durability of the pivot 16, these pivot holes 64 are reinforced by eyelets 66 that are bonded in the holes 64, each of the eyelets 66 preferably having an annular flange 67 at one end which overlaps the exposed upper surface 26 of upper wing 12 and lower surface 28 of lower wing 14 to protect these surfaces. The pivot 16 is completed by rivet 68 which extends through the two eyelets 66 and has heads 69 which overlap the flanges 67 of eyelets 66.

FIG. 10 illustrates the angular relationships between the general longitudinal axes 33 of wings 12 and 14 and the vertical components of the tailfins 42 and 44, and how these relate to the best glide speed configuration of the glider 10 that will automatically be established by the vertical tailfin components. The angle 70 at which each of the wing tip edges 20 and the vertical components of the tailfins 42 and 44 is offset forwardly and outwardly from its respective wing axis 33 determines the swingout angle of each wing at best glide speed. Such wing swingout angle is designated 72 in FIG. 10, and is defined to be the angle between the longitudinal axis 15 of glider 10 and the axis 33 of each wing 12 and 14 at best glide speed. Extensive testing of a series of experimental prototypes indicates that the tailfins 42 and 44 will reliably swing the wings 12 and 14 out at best glide speed to a position wherein the tailfins 42 and 44 are angularly offset outwardly no more than approximately 5° to the relative wind, this angle being designated 74 and representing the angle of attack of the tailfins 42 and 44 to the relative wind at best glide speed. Thus, the angle 70 between the vertical tailfin components and the wing axis 33 minus the angle of attack 74 determines the swingout angle 72 for each wing 12 and 14. Although good glide characteristics are achievable with a variety of wing swingout angles 72, experimental prototypes wherein the swingout angle 72 is approximately 45° for each wing, making an included angle of approximately 90° between the two wing axes 33, provides excellent flight characteristics. Such 45° swingout angle 72 has been found to be reliably achieved in the experimental prototypes by providing a tailfin vertical component offset angle 70 from wing axis 33 of approximately 50°.

In order for the straight inner wing edges 18 to be aligned parallel with the longitudinal axis 15 of glider 10 during the best glide speed flight mode, the inner edges 18 are angularly offset from the longitudinal axis 33 of the respective wings by an angle designated 75 in FIG. 10, which is the same angle as the swingout angle 72 of each wing. Thus, in the foregoing example wherein the wing swingout angle 72 is approximately 45°, the angle 75 will be set in manufacture of the glider 10 at 45°.

One having ordinary skill in the art would expect that in order to provide reliable and repeatable relative wing geometry during flight it would be necessary to mechanically hold the wings 12 and 14 in close parallel relationship by means of a relatively tight or closely-fitted pivot 16. Instead, a quite loose fit at the pivot 16 surprisingly provides by far the best mechanical operating characteristics and flight characteristics for the swing wing glider 10. Such a loose pivot 16 provides full freedom of pivoting movement between the wings, enabling them to virtually bounce out from the collapsed or closed position at launch to the correct angular extension for the launch speed, and then allowing the wings to continuously freely adjust to the varying flight conditions through the full extent of the flight. Referring to FIGS. 11 and 12 of the drawings, it will be seen that by having a loose pivot 16 a dihedral will automatically develop between the wings 12 and 14 in flight, this dihedral having an angle 78 which improves stability in the roll direction (i.e., about the longitudinal axis 15 of glider 10) during flight. The dihedral angle 78 will reliably and repeatably develop in each flight because the lift of wings 12 and 14 will tilt or cock them relative to the noseweight that is generally centered along the longitudinal axis 15. The dihedral angle 78 will be established by the amount of vertical spacing the loose rivet 68 will allow between the wings 12 and 14 at pivot 16, with the straight inner edge 18 of upper wing 12 engaged against top surface 26 of lower wing 14.

Even though one having ordinary skill in the art would expect the gain of the dihedral stability advantage to be compensated for by a loss in reliability and repeatability of wing geometry during flight, such is surprisingly not the case because the very fact of the dihedral enables the Bernoulli principle to be utilized to hold the wings 12 and 14 together in the front/rear direction (i.e., in the direction of the axis 15 of glider 10). This is enabled because the dihedral angle 78 opens up an axially-directed (along axis 15) slot 80 between the overlapped root portions 32 of wings 12 and 14, this axial slot 80 having a narrow V-shaped cross-section of the same angular extent as the dihedral angle 78. The operation of Bernoulli's principle to thus hold the wings together in the front/rear direction is best illustrated in FIG. 12 by the airflow arrows. The airstreams above upper wing 12 and below lower wing 14 along the entire chordal extent of the wings will be at ambient pressure. However, the region where these airstreams come together immediately to the rear of the trailing edges 24 of both wings 12 and 14 will be at a reduced pressure. This reduced trailing pressure region has the effect of accelerating the rearward flow of air in the slot 80 which, according to the Bernoulli principle, provides a corresponding reduction in the air pressure in slot 80, has the effect of vacuum-biasing the overlapped root portions 32 of wings 12 and 14 together in a stable front-/rear geometry. The vacuum-biasing force assures that the entire length of the straight inner edge 18 of upper wing 12 will be in engagement with the upper surface 26 of lower wing 14 under all conditions of flight after the wings have opened from their closed launching configuration.

With the straight innner edge 18 of upper wing 12 aligned parallel to the longitudinal axis 15 of glider 10 at the best glide speed configuration, as illustrated in FIG. 10, the wings 12 and 14 will be perfectly geometrically located relative to each other for identical lift. In a typical high-speed mode flight, such as shortly after launch, each wing may be swung inwardly from the best glide speed configuration typically by an amount of about 10°. Although this would angle the straight inner edge 18 of upper wing 12 relative to the longitudinal axis 15 of glider 10 and thereby permit a slight uptilt of the upper wing 12 relative to the lower wing 14 in the front-to-rear chordal direction, which in turn would provide slightly more lift of the upper wing than the lower wing, this is so slight that it has not observable adverse effect on the flight characteristics.

It will be appreciated that the aforesaid stability of the geometry between the wings 12 and 14 in flight applies equally to the wings 12 and 14 per se, the elevators 34, and the upper and lower tailfins 42 and 44, respectively.

FIGS. 13–17 illustrate the manner in which the swing wing glider 10 is launched, and the aerodynamic factors involved in the wing opening sequence after launch. The longest and best flights are achieved with the use of an elastic launching device such as the device 82 illustrated in FIGS. 13 and 14, although the swing wing glider 10 may alternatively be satisfactorily hand-launched. A conventional elastic launching device 82 may be employed, consisting of an elastic band 84 attached to one end of a launching stick 86. When thus elastic band or power-launched, the glider 10 is in its closed or collapsed configuration, as shown in FIGS. 3 and 4, in the right-hand two views of FIG. 13, and in FIG. 14. The glider 10 is held by a rearward holding hand 88, with the overlapped finger grip tabs 38 being gripped between the thumb 90 and index finger 92 of hand 88, preferably with the thumb 90 under the tab 38 of lower wing 14 and the index finger 92 over the tab 38 of the upper wing 12. The launching stick 86 of elastic launching device 82 is grasped in the other hand, which is the forward launching hand 94, and elastic band 84 is engaged with launching hook 52 in the manner described hereinabove and stretched to produce the potential energy that is imparted as kinetic energy to glider 10 when the finger grip tabs 38 are released from between the fingers 90 and 92.

As best illustrated in FIG. 3, in the closed or collapsed launching configuration of glider 10, each wing 12 and 14 has its longitudinal axis 33 angularly offset from the longitudinal axis of the glider 10 an angular amount designated 96 in the direction that the wing will swing when the wings automatically aerodynamically open. The fully-closed or collapsed configuration of glider 10, and hence the size of this small initial angle 96 of each wing, is determined by engagement of the corners of the finger grip tabs 38 against respective tailfins of the opposite wing. Thus, as seen in FIG. 3, the finger grip tab 38 of upper wing 12 engages the upper tailfin 42 of lower wing 14; while at the same time the finger grip tab 38 of lower wing 14 engages the lower tailfin 44 of upper wing 12. The overlapped finger grip tabs 38 are made sufficiently large so that the tailfins 42 and 44 of upper wing 12 are transversely spaced from the tailfins 42 and 44 of lower wing 14 sufficiently far apart to accommodate therebetween the thumb 90 and index finger 92 of a typical rearward holding hand 88. The initial offset angle 96 will typically be in the range of from about 5° to about 10°. Thus, for the example given in connection with FIG. 10 in which the vertical components of tailfins 42 and 44 have an offset angle 74 from the longitudinal axis 33 of the respective wings of approximately 50°, the approximately 5° to 10° range for the closed, initial angle 96 will cause the tailfins 42 and 44 of both wings to be toed outwardly relative to the longitudinal axis of glider 10 an angle 98 which is in the range of from approximately 40° to approximately 45°. This angle 98 will be the angle of attack of the vertical components of all of the tailfins 42 and 44 to the relative wind at launch.

When the swing wing glider 10 is released from the position shown in the right-hand view of FIG. 13 and in FIG. 14, during the acceleration that is imparted to glider 10 from elastic band 84 the wings 12 and 14 will remain fully closed because of their inertia which opposes the forward accelerating force. Then, after the glider 10 is fully released from the influence of elastic band 84, it will travel a few feet before the wings 12 and 14 swing out to a high-speed mode configuration. A high-speed mode is hereby defined as any speed that is greater than the best glide speed of the glider 10, and almost always an elastic or power launch of the glider 10 will accelerate the glider 10 past its best glide speed to a high-speed mode which may even be several times as fast as the best glide speed. Conversely, a low-speed mode is hereby defined as any speed that is less than the best glide speed of glider 10, and such low-speed mode may be caused by a launch which places the glider 10 in an approach to a stall or even a substantially full vertical stall, or by an updraft.

The forces that cause the opening or swingout action of the wings 12 and 14 are entirely aerodynamic forces applied to the vertical components of tailfins 42 and 44, these vertical components acting as vertical airfoils which aerodynamically induce horizontal liftout or swingout forces transverse to the relative wind and hence to the longitudinal axis 15 of glider 10. There are three phases in this liftout operation of the tailfins 42 and 44. The first phase involes the initial part of the wing swingout action from the closed configuration of glider 10 as shown in FIG. 3 and in the second position in FIG. 13 after the glider 10 has been launched but before it has started opening, and as shown in FIG. 15. In the example shown in FIG. 10 and previously discussed, the initial angle of attack of the vertical tailfn components to the relative wind will be on the order of about 40° to 45°, this angle of attack being designated 98 and the relative wind being indicated by airflow lines 100 in FIG. 15. With such high angle of attack the vertical components of tailfins 42 and 44 cannot operate as normal airfoils, because the vertical components of the outer, rearwardly-facing surfaces of tailfins 42 and 44 are fully stalled, as indicated by the turbulent airflow lines in the region 101. Nevertheless, the airflow indicated by lines 100 will apply a strong positive planing pressure to the vertical components of the inner and forwardly-facing surfaces of tailfins 42 and 44, and this will produce a strong outwardly-directed force component which initiates the wing swingout movement.

Figure 16:
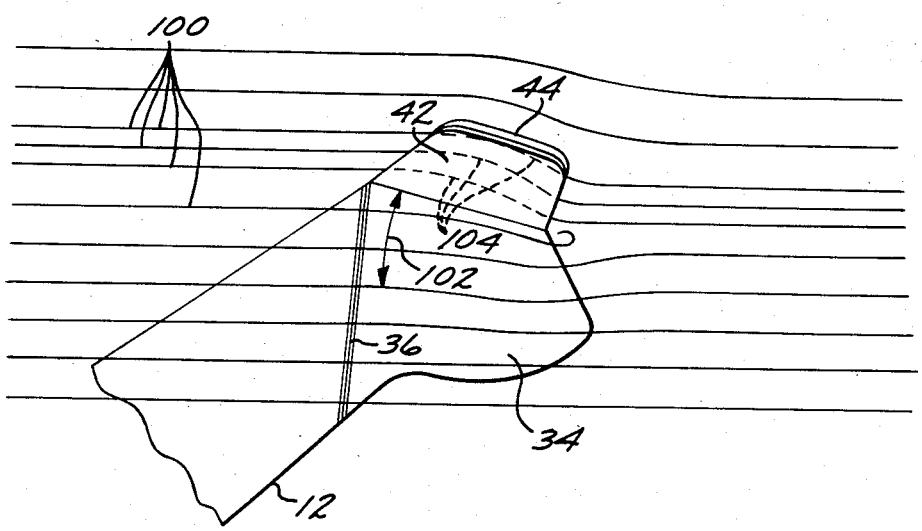
FIG. 16 is an enlarged, fragmentary top plan view of the encircled region designated 14 in FIG. 11, illustrating the airstreaming around the tailfins when the wings have opened after launch sufficiently for the tailfins to become fully unstalled so as to be efficient lift-out airfoils.

This same mode of operation will continue as the wings swing outwardly until the wings have opened to a configuration like that shown in the third position of the glider 10 in FIG. 13, and as shown in FIG. 16, wherein the angle of attack of the vertical components of tailfins 42 and 44 to the relative wind 100 has been reduced to an angle 102 at which the vertical tailfin components have become fully unstalled, so that they have a strong negative airfoil pressure on their outwardly and rearwardy-facing surfaces, in addition to a weaker positive planing pressure on their inwardly and fowardly-facing surfaces, whereby a strong swingout force continues to be applied to the tailfins 42 and 44. The laminar airflow lines in the negative airfoil pressure zone are designated 104 in FIG. 16. Typically, the angle of attack 102 at which the vertical tailfin components thus become unstalled will be approximately 15° or slightly higher. Assuming it is 15°, then in the example of glider 10 given in connection with FIG. 10, the swingout angle of the longitudinal axis 33 of each wing from the longitudinal axis 15 of glider 10 beyond which the tailfins become good airfoil liftout members will be aproximately 35°, this angle being designated 105 in the third, partly-open position of FIG. 13.

By the time the wings have swung out to the angle 105 of FIGS. 13 and 16, there is a third operational factor which contributes swingout force to the vertical components of the lower tailfins 44 only. This factor is the impingement of the underwing outwash of air against the inner surfaces of the lower tailfins 44, as illustrated by the airflow lines 106 in FIG. 17. This underwing outwash produces upwardly-swirling tip vortices on a conventional wing, but with the downturned tailfins 44 the under wing outwash applies positive pressure on the vertical components of the inner surfaces of the lower tailfins 44, providing further swingout force, and this swingout force continues even after the angle of attack of all of the tailfins has become smaller than conventional airfoil lift is capable of achieving. Thus, the final increment of liftout to the best glide speed configuration of glider 10 is caused by this underwing outwash, and it places the vertical components of the tailfins 42 and 44 at such a low angle of attack to the relative wind 100 that tailfin drag is minimal in the best glide configuration of the glider 10. As described above in connection with FIG. 10, the angle 74 of attack of the vertical components of talfins 42 and 44 to the relative wind is generally no more than approximately 5°.

AERODYNAMIC ADJUSTMENT OF WING EXTENSION

The highest vertical lift/drag ratio for the swing wing glider 10 occurs at the best glide speed of the glider 10, and the vertical lift/drag ratio goes down (i.e., the drag becomes a more dominant factor relative to airfoil lift of all horizontal airfoil components which provide the gliding lift) on both the high-speed and low-speed sides of the best glide speed. The present invention utilizes this characteristic of airfoils to automatically aerodynamically swing the wings 12 and 14 inwardy from their best glide speed configuration to a more closed or partly-retracted configuration on both the high-speed and low-speed sides of best glide speed, and this partial closing or retraction will surprisingly be to the extent that is required to provide optimum high-speed flight characteristics at any speed higher than best glide speed, and to substantially instantaneously compensate for speeds lower than best glide speed so as to bring the glider 10 back into its best glide speed mode.

The only lift factor that is employed in the invention in the automatic aerodynamic adjustment of wing extension is the liftout force on the vertical components of the tailfins 42 and 44 discussed above in connection with FIGS. 15, 16 and 17, and primarily in connection with FIGS. 16 and 17. The vertical tailfins must be at their maximum aerodynamic liftout efficiency relative to drag to produce the maximum wing extension, which is the best glide speed configuration. Thus, best vertical tailfin liftout/drag speed is substantially the same as best horizontal airfoil component lift/drag speed for the glider 10. However, a number of drag factors are involved in this automatic aerodynamic wing adjustment according to lift/drag ratio. These include both profile drag and induced drag of the wings 12 and 14, of the elevators 34, and of each of the tailfins 42 and 44. The induced drag on the tailfins 42 and 44 is caused by both the components thereof that are parallel to the elevators 34 and the vertical components, the vertical components having their induced drag caused by the liftout airfoil operation as shown in FIGS. 15 and 16 and described above in connection therewith.

Profile drag and vertical component induced drag on the tailfins 42 and 44 are important factors in the automatic aerodynamic wing adjustment above and below best glide speed, for two principal reasons. First, the tailfins 42 and 44 are airfoil members of substantial surface area and are located at the maximum lever arm distance from the fulcrum represented by the pivot 16, so that they have a powerful drag influence on the pivoting wing adjustment. Second, both the profile and the angle of attack of tailfins 42 and 44 to the relative wind rapidly increase with closing or retracting movements of the wings from their best glide speed configuration, and hence both profile drag and the induced drag of the vertical tailfin components increase rapidly with such closing or retracting movements of the wings from the best glide speed configuration.

HIGH SPEED MODE AERODYNAMIC WING ADJUSTMENT

In the high speed flight mode, which is herein defined as any speed above best glide speed, the increased relative wind speed causes an increase in profile drag above the profile drag at best glide speed of all components of glider 10; and also causes an increase in the induced drag of all lift surfaces, including induced drag caused by gliding lift of wings 12 and 14 and negative lift of both the elevators 34 and the elevator components of the tail fins 42 and 44, and also the liftout induced drag of the vertical components of tailfins 42 and 44; and the summation of all of these drag increases will cause the wings to swing inwardly and partially retract. The amount of such inward retraction from the best glide speed configuration will increase greater [conflicting corrections here] for higher speeds above best glide speed. Thus, as the speed increases above best glide speed, the wings retract to more and more of a dart-shaped configuration which has less and less wing lift, and accordingly is more efficient for the higher speeds. Thus, at the highest speed, which is immediately after launch, when the wings open to a high speed mode configuration, the glider 10 will have its minimum lift and will therefore be capable of a long and high flight pattern such as cannot be achieved by conventional fixed-wing gliders.

In this high speed, more dart-shaped mode with the wings partially retracted, while there is a considerable increase in both the profile drag of the tailfins and the liftout induced drag of the vertical tailfin components relative to the airfoil liftout force of the vertical tailfin components, there is at the same time reduced profile drag as well as reduced induced drag of the more dart-shaped wings, so overall drag forces are not really large and do not rapidly slow down the glier 10 in this high speed mode.

The swing wing glider 10 is generally in a high speed mode shortly after launch, coming down from the top of a loop, or when subjected to a downdraft.

When the glider 10 slows down from drag from a particular high speed mode, as the speed gradually reduces the wings will automatically gradually swing back outwardly because of the increasing liftout/drag ratio as the glider 10 slows down toward its best glide speed, until the wings are extended all of the way out to the best glide speed configuration at best glide speed.

As the wings automatically aerodynamically initially swing open to a high speed flight mode upon launch, induced drag of all airfoil components increases at a rapidly and continuously increasing rate, and at a point such as is illustrated in FIG. 16 at which the vertical tailfin components become unstalled as liftout airfoils, they will have their maximum aerodynamic liftout force and hence their maximum induced drag, and this, applied at the longest lever arm, serves to damp further outward movement despite the angular momentum of the rapid swingout movements of the wings. The wings then instantaneously automatically adjust to the correct configuration for that particular high speed flight mode without any hunting being observable. In that configuration the total drag forces and tailfin liftout forces are in balance. At this balance point the tailfins will normally have swung out at least slightly beyond their positions of maximum vertical component airfoil liftout force, so increasing total drag and decreasing aerodynamic liftout force enables such balance to be effected. At the same time, the decreasing taper of the plan form of the wings from their root ends 18 out toward their tip ends 20 minimizes outboard inertia that might otherwise tend to overcome such damping, thereby avoiding the possibility of the wings swinging all of the way out to a stall condition in their intial swingout to a high speed flight mode.

Hunting is also prevented by damping when the wings swing inwardly from the best glide speed mode to accommodate a high speed mode, which might occur with a downdraft or coming down out of a loop. Thus, as the wings swing inwardly to a more closed angle, both profile drag of the tailfins and the vertical tailfin component airfoil induced drag rapidly increase due to the greater angle of attack of the tailfins to the relative wind, so as to damp further inward pivoting when the wings have reached their correct partially-retracted positions for that particular high speed flight mode.

LOW SPEED MODE AERODYNAMIC WING ADJUSTMENT

As the glider 10 slows down from its best glide speed to a low speed flight mode (which is any speed less than best glide speed), the sink rate will increase, which produces corresponding increases in both profile drag and induced drag of the horizontal airfoil components which provide gliding lift. At the same time, the vertical tailfin components are, because of the reduced speed, approaching a stalled condition, and hence are rapidly losing their aerodynamic liftout force, and this enables the increased drag factors to instantaneously adjust the wings inwardly from the best glide speed configuration to a more retracted configuration. Such more retracted configuration then reduces wing lift relative to noseweight and allows the nose to drop and the speed to increase back to best glide speed, and the corresponding reduction in the drag factors then enables the wings to swing back out to the best glide configuration.

This automatic aerodynamic low speed adjustment back to best glide speed and configuration is very sensitive and quick-acting, and the wings automatically continuously adjust to hold the glider at best glide speed. In fact, the adjustments to the effects of turbulence on both the low speed and the high speed sides of best glide speed are so quick and positive-acting that in normal gliding flight there will be very little variance from best glide speed despite updraft or downdraft turbulence. The wings appear to be constantly finely adjusting as required to maintain best glide speed. Because of the strong and rapid corrections always seeking best glide speed, these automatic aerodynamic wing adjustments are able to provide good flight characteristics with a considerably wider margin of tuning of the front-to-rear balance than with a fixed wing glider.

In the usual in-flight approach to a stall, or even for a full stall, the wings, in only partially closing or retracting, allow the nose to drop and best glide speed to be resumed without overcompensation to a too-closed or retracted wing condition, i.e. without hunting. This is because the inward-swinging movement as glider 10 aproaches a stall is damped, as follows: as the wings pivot toward a more closed or retracted angle, profile drag and induced drag of the vertical tailfin components rapidly increase due to their greater angle of attack to the relative wind such as to damp further inward pivoting when the wings have reached the correct configuration for the nose to drop and increase the flight speed back to best glide speed.

The most spectacular flight mode of the swing wing glider 10 is a substantially vertical stall, which can be achieved by a straight and level launch toward a loop but without sufficient power to go beyond a substantially straight up or vertical orientation of the glider 10. As the speed falls rapidly below best glide speed in the approach to the vertical stall, the wings partially retract and are in a partially-retracted condition when the glider 10 becomes fully stopped in the air. Then, the nose of the glider will either fall forwardly or flip backwardly until it is directed straight downwardly, and the first straight downward FALLING movement will cause the wings to completely close or collapse to the configuration of FIG. 3 because in the first part of this downward movement there is practially no vertical tailfin aerodynamic liftout force while there nevertheless is substantial profile drag of the tailfins; then, after several feet of downward acceleration, the wings are automatially swung back out and best glide configuration and speed are quickly established.

Although the swing wing glider 10 is specifically adapted for elastic band power launching, good flights are also obtainable by hand launching, which is often preferable for indoor flights. The preferred method of hand launching is to have the wings partially extended with each wing swung out so that its longitudinal axis 33 is in the range of approximately 20° to 30° out from the longitudinal axis 15 of the glider; i.e., with the wings extended to an included angle in the range of approximately 40° to 60°. Then the glider is held from the rear with the forefinger of one hand engaged over the upper wing 12 proximate the longitudinal axis 15 of the glider 10, and the thumb and middle finger engaged under the bottom wing 14, and the glider is then sailed forwardly, preferably at a speed that is greater than best glide speed.

An alternative method of holding the glider for hand launching is to have the wings closed, as in FIG. 3, or substantially closed, and then hold the glider between the thumb and index finger with these fingers engaged against the edges 22 and 24 of the wings 12 and 14 proximate the regions 107 designated in FIG. 3, the regions 107 being where the leading edge 22 of each wing crosses the trailing edge 24 of the other wing.

In addition to its surprising new modes of operation in flight and resulting excellent flight characteristics, the swing wing glider 10 has a surprising and unexpected ability to withstand impacts without suffering damage. Thus, if the nose of the swing wing glider 10 strikes an object first, the wings simply swing forward relative to the nose, and spread the force of the impact along the wings, whereby the energy of the impact is dissipated along most of the structural length of the glider 10, and the energy is also dissipated over an extended interval of time as the wings are swinging forward. If one wing should solidly strike an object, it simply collapses rearwardly relative to the other wing, and the other wing then swings on by or around the ostruction, again dissipating the energy of impact over much of the structure of the glider 10 and slowing down the rate of energy dissipation upon impact. If only the tip of a wing strikes an object, generally it will fold rearwardly just enough to pass by the object, and although the flight trajectory will be somewhat diverted, satisfactory flight will normally continue.

Another surprising result of the swing wing construction of the glider 10, which is a corollary of its ability to withstand impact, is that if the glider 10 should strike a person or object, it causes minimal trauma to that person or object because the energy is dissipated over a wide zone and over an extended time interval. Thus, the swing wing glider 10 is much safer than conventional gliders. An additional safety factor is that because of the absence of the weight of a fuselage and tis that because of the absence of the weight and battering ram characteristics of a fuselage, and also because only minimal noseweight is required, the swing wing glider 10 has much less energy to dissipate upon impact than the conventional glider.

The loose pivot 16 and corresponding very free-swinging movement of the wings 12 and 14 relative to each other enable the collapse and energy dissipation of the glider 10 upon impact to be very free and instantaneously effective in protecting the glider 10 from damage and also in protecting any person or object struck by the glider 10 from trauma.

The swing wing glider 10 of the present invention is not only less vulnerable to damage from collision than conventional gliders because of the fact that the wings can simply fold upon impact, but also because the glider 10 of the invention is made of only two structural pieces which are permanently hinged together, whereas in the conventional glider a wing, elevator and vertical tailfin are all simply wedged into slots, and upon impact these are typically moved in the slots or even knocked out of the slots so as to either interfere with the flight characteristics or even render the glider unflyable.

In addition to the outstanding durability and safety of the swing wing glider 10, it has other surprising advantages over conventional fixed-wing gliders. One such advantage is that in the collapsed or closed configuration of FIG. 3, the wings are for the most part overlapped in a narrow, highly compact arrangement having essentially double the shear strength of a single wing. Thus, in the closed configuration the glider 10 can be conveniently carried in the hand, or nose-down in a shirt or jacket pocket, or in the glove box or on the dashboard of a car. This makes the glider 10 much less liable to damage than conventional gliders during handling, carrying and transport. Another surprising advantage of the swing wing glider of the present invention over conventional fixed-wing gliders is that it has substantially no parasitic drag, whereas conventional gliders have the parasitic drag of a fuselage, and those gliders which have their wings sprung out by elastic band or wire spring means during flight have the added parasitic drag of the spring-out mechanism. Such parasitic drag, coupled with the added weight of the fuselage and spring-out mechanism if such is present, cause conventional gliders to have a much higher sink rate, and correspondingly less flight time, than the swing wing glider of the present invention. A further surprising advantage of the present swing wing glider is that it is a true "action toy," with a wing swinging action that for the first time is continuing and varied according to flight conditions throughout the full extent of the flight, whereas prior art gliders with spring-out mechanisms have only a single spring-out event that momentarily occurs at the end of an initial ballistic part of the flight.

Figure 18:
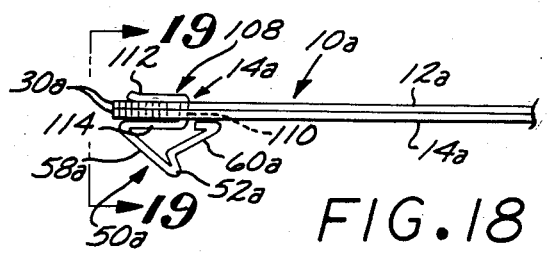
FIG. 18 is a fragmentary side elevational view illustrating a second form of the swing wing glider of the present invention which has a wire launching projection that is formed to also serve as the pivot.
Figure 19:
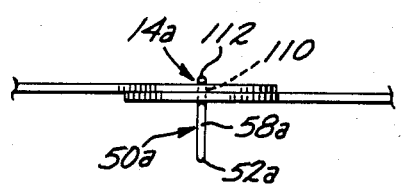
FIG. 19 is a fragmentary front elevational view taken on line 19—19 in FIG. 18.

FIGS. 18 and 19 show a second embodiment of the present invention which is otherwise the same as glider 10 of FIGS. 1-17, with the same structure, new modes of operation, and surprising new results, but in which the swing wing glider 10a has a wire launching projection that is formed to also serve as the pivot. The swing wing glider 10a has upper and lower wings 12a and 14a, respectively, that are pivoted together by a loose pivot 16a consisting of a U-shaped fastener 108 that serves as a rivet. The fastener 108 includes a pivot pin 110 that extends through registering holes in the top and bottom wings 12a and 14a, respectively, with the wire forming the pivot pin 110 being bent forwardly at right angles to pin 110 into an upper horizontal leg 112 which overlaps the upper surface of upper wing 12a; and the pin wire also being bent forwardly below the lower wing 14a at right angles to pin 110 into a lower horizontal fastener leg 114; the upper and lower legs 112 and 114, respectively, of the U-shaped fastener 108 being parallel to each other. At the front end of lower horizontal leg 114, proximate the nose 30a of bottom wing 14a, the wire is bent rearwardly and downwardly to form a launching projection 50a having a launching hook 52a. Thus, the wire is bent rearwardly and downwardly from the forward end of lower horizontal leg 114 proximate the nose 30a of lower wing 14a to form a front cam ramp 58a; the wire is then bent upwardly and forwardly to form the launching hook 52a; and then the wire is bent rearwardly and upwardly to form a rear cam ramp 60a. The front and rear cam ramps 58a and 60a serve the same functions as the corresponding leading and trailing edges 58 and 60, respectively, of the launching projection 50 of the glider 10.

FIGS. 20-23 illustrate a third embodiment of the present invention wherein a swing wing glider generally designated 10b is provided with stiffening ribs which stiffen its upper wing 12b and lower wing 14b generally in the chordal direction both in the region of the overlapped root portions 32b of the wings and in the regions of the junctures 36b between the wings and their respective elevators 34b. Aside from the added stiffening ribs and a modified, higher aspect ratio wing plan form, the swing wing glider 10b; is identical to the swing wing glider 10 of FIGS. 1-17, with the same structure, new modes of operation, and surprising new results.

Thus, the upper and lower wings 12b and 14b, respectively, of glider 10b are pivoted at 16b, and each of the wings 12b and 14b includes a straight inner edge 18b, a leading edge 22b, a trailing edge 24b with a heel 25b defined between the trailing edge 24b and inner edge 18b, a top surface 26b and a bottom surface 28b. The wings 12b and 14b also have registering arcuate noses 30b, and overlapped root portions 32b defined transversely between the straight inner edges 18b and defined longitudinally between the noses 30b at the front and the wing trailing edges 24b at the rear. Elevators 34b bend or deflect upwardly from the general planes of wings 12b and 14b at generally transverse bend lines 36b, and elevators 34b have overlapped finger grip tab portions 38b.

Upper and lower tail fins 42b and 44b extend from the wing tips 20b. Launching projection 50b has its base 54b attached to the bottom surface of lower wing 14b, and extends downwardly to launching hook 52b.

A pair of inner, forward stiffening ribs 116 and 118 is rigidly connected to the top surface 26b of upper wing 12b, and a matching pair of inner, forward stiffening ribs 120 and 122 is rigidly connected to the bottom surface 28b of lower wing 14b.

The stiffening rib 116 lies parallel to and closely proximate the straight inner edge 18b of upper wing 12b, and similarly the stiffening rib 120 lies parallel to and closely proximate the straight inner edge 18b of lower wing 14b. Each of these inner end stiffening ribs 116 and 120 preferably extends all of the way from proximate the nose 30b of its respective wing rearwardly to proximate the heel 25b of its respective wing so as to span the longest possible chordal extent of the respective wing. The other upper rib 118 preferably has the same length and shape as rib 116, is arranged parallel to the rib 116, and also extends rearwardly from proximate the nose 30b; while similarly, the other lower rib 122 preferably has the same length and shape as rib 120, is arranged parallel to the rib 120, and also extends rearwardly from proximate the nose 30b. All four of the inner, forward stiffening ribs 116, 118, 120 and 122 are preferably equally laterally spaced from the longitudinal, central axis 15b of glider 10 in the best glide speed configuration of glider 10, as illustrated in both FIG. 20 and FIG. 23. Thus, the upper stiffening ribs 116 and 118 are bilaterally symmetrical about the longitudinal axis 15b at best glide speed, and also the lower stiffening ribs 120 and 122 are bilaterally symmetrical about the longitudinal axis 15b at best glide speed. As seen in both FIG. 20 and FIG. 23, the forward end portions of lower stiffening ribs 120 and 122 extend along the side edges of the base 54b of launching projection 50b.

Looking at FIG. 20, it wll be seen that the inner edge lower wing stiffening rib 120 extends from the rear edge 24b of wing 14b approximately two-thirds of the chordal distance toward the front edge 22b; while the other lower wing stiffening rib 122 extends rearwardly from proximately the leading edge 22b approximately two-thirds of the chordal distance toward the trailing edge 24b; and in this way the two ribs 120 and 122 chrodally overlap to span and stiffen the full chordal extent between the leading and trailing edges 22b and 24b, respectively, of the lower wing 14b. Similarly, the upper wing stiffening ribs 116 and 118 cooperate to span and thereby stiffen the entire chordal extent between the leading and trailing edges 22b and 24b, respectively, of the upper wing 12b.

As seen in FIG. 20 and as can be best appreciated from FIG. 23, with the glider 10 in its best glide speed configuration, the four stiffening ribs 116, 118, 120 and 122 are all aligned with the relative wind and therefore add minimal additional profile drag to the glider 10 which is inconsequential to the flight characteristics. As the wings 12b and 14b swing inwardly from the best glide speed configuration, the upper wing stiffening ribs 116 and 118 will become angularly offset in one direction from the longitudinal axis 15b and from the relative wind, while the lower wing stiffening ribs 120 and 122 will become angularly offset an equal amount in the opposite direction from the longitudinal axis 15b and the relative wind, and such equal angular offsets of the upper and lower stiffening ribs will cancel out any canard rudder effect that might otherwise tend to divert the glider 10 from a straight path.

As can be seen in FIG. 23, the upper stiffening ribs 116 and 118 are in vertical registry with the respective lower stiffening ribs 122 and 120 when the swing wing glider 10b is in its best glide mode configuration.

The stiffening ribs 116, 118, 120 and 122 each have a continuous airfoil shape along its length that merges with the surface of its respective wing at the front and rear ends of the rib so that there are no abrupt edges capable of creating turbulence. Because of this airfoil shape, the ribs 116, 118, 120 and 122 introduce a minimum of profile drag, even when their profiles are angled to the relative wind when the wings partially retract from the best glide speed configuration during automatic aerodynamic wing adjustments to accommodate various flight conditions.

Each of the wings 12b and 14bof glider 10b also has an upper outer rearward stiffening rib 124 and a lower outer rearward stiffening rib 126, the upper and lower outer stiffening ribs 124 and 126 on each wing preferably also being in vertical registry. These outer rearward stiffening ribs 124 and 126 preferably extend from proximate the leading edges 22b of the wings rearwardly past the bend lines 36b onto the elevators 34b, stopping at rear ends just short of the overlapped finger grip tabs 38b as these are indicated by the dashed lines 40b so as to not interfere with a flush overlapping of the tabs 38b when gripped between the fingers. The outer, rearward stiffening ribs 124 and 126 may be oriented parallel to the tailfins 42b and 44b as shown in FIG. 20, in which case they will serve to slightly assist the operation of the vertical tailfin components as described in detail hereinabove, but in which case they are nevertheless oriented generally in the chordal direction. Alternatively, the outer, rearward stiffening ribs 124 and 126 may be oriented in the chordal direction parallel to the straight inner edges 18b of both wings, and accordingly also parallel to the stiffening ribs 116, 118, 120 and 122, and parallel to the longitudinal axis 15b of glider 10b when the glider is in its best glide speed configuration as shown in FIG. 20. The primary purpose of the outer, rearward stiffening ribs 124 and 126 is to stabilize the upward deflection or bend angle of each of the elevators 34b and prevent this angle from varying during the useful life of the glider 10b. In particular, it is important that the two elevators 34b retain the same deflection or bend angle over the useful life of the glider 10b to avoid introduction of the undesired roll characteristic, and the presence of the outer, rearward stiffening ribs 124 and 126 assures that the two elevator deflection angles will remain the same.

As with the inner, forward stiffening ribs, these outer, rearward stiffening ribs 124 and 126 also have continuously curving airfoil shapes from their front ends to their rear ends that merge into the upper and lower surfaces of the wings so as to minimize profile drag.

It will be noted from a comparison of the plan view of swing wing glider 10b in FIG. 20 with the plan views of glider 10 in FIGS. 1, 2 and 10, that the wings 12b and 14b of glider 10b are narrower relative to their lengths than the wings 12 and 14 of glider 10; i.e., the wings of glider 10b have a higher aspect ratio of the glider 10 so as to provide a correspondingly higher vertical lift/drag ratio. Nevertheless, the plan forms of the wings of glider 10b are such that there is no sacrifice in the lengths of the straight inner edges 18b of the wings 12b and 14b, so that the same geometrical stability between the wings in flight is achieved in the glider 10b as in the glider 10. This higher aspect ratio is achieved in glider 10b by having a rearwardly concave plan form of each of the wings 12b and 14b proximate their overlapped root portions 32b and extending somewhat outwardly therefrom, these concave rearward plan forms being defined by concave trailing edge portions 24c. These concave trailing edge portions 24c commence proximate the wing heels 25b, causing the heels 25b to be much more pointed than the heels 25 of the wings of glider 10. These concave trailing edge portions 25c curve tangentially into the primary lengths of trailing edges 24b which are preferably substantially straight.

While the present invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. A glider which comprises:
   a pair of elongated, generally flat wings having forward, inner root portions that are freely pivotally interconnected,
   each of said wings extending rearwardly and outwardly from its said root portion to an outer tip portion, and
   tailfin means on each of said wings rearwardly and outwardly spaced from overlapped portions,
   each of said tailfin means having a component that is vertical to the general horizontal plane of its respective wing and is angularly offset from a trailing edge to a leading edge forwardly and outwardly from the general longitudinal axis of its respective wing,
   said angular offset causing said vertical components to each have an airfoil liftout angle of attack to the relative wind during flight which causes said wings to swing out to an extended best glide configuration,
   said wings being freely automatically pivotally adjustable during flight in a range of movement between said extended best glide configuration and a substantially more retracted configuration under the opposing influences of aerodynamic liftout forces on said tailfin means urging said wings toward a more extended configuration and drag forces on said wings and tailfin means urging said wings toward a more retracted configuration, the ratio of said liftout forces to said drag forces being greatest and said wings being automatically extended to said best glide configuration at substantially the best glide speed of said glider, and said ratio being reduced and said wings being automatically retracted from said best glide configuration at speeds both higher and lower than said best glide speed,
   said wing retraction at said higher speeds providing reduced lift and corresponding greater flight efficiency for such higher speeds, and said wing retraction at said lower speeds providing reduced lift causing said forward wing portions to drop and the speed of said glider to increase toward its said best glide speed.

2. A glider as defined in claim 1, wherein said wings and tailfin means are substantially bilaterally symmetrical.

3. A glider as defined in claim 2 which has no fuselage.

4. A glider as defined in claim 2, wherein said wings are generally flat.

5. A glider as defined in claim 2, wherein at least a portion of said vertical component of each of said tailfin means extends downwardly from its respective wing.

6. A glider as defined in claim 5, wherein at least a portion of said tailfin means inclines generally downwardly and outwardly from its respective wing.

7. A glider as defined in claim 2, wherein at least a portion of said vertical component of each of said tailfin means extends upwardly from its respective wing.

8. A glider as defined in claim 7, wherein at least a portion of said tailfin means inclines generally upwardly and outwardly from its respective wing.

9. A glider as defined in claim 2, wherein said vertical component of each of said tailfin means extend both downwardly and upwardly from its respective wing.

10. A glider as defined in claim 9, wherein said tailfin means on each of said wings comprises a lower tailfin and an upper tailfin.

11. A glider as defined in claim 10, wherein each of said lower tailfins inclines generally downwardly and outwardly from its respective wing, and each of said upper tailfins inclines generally upwardly and outwardly from its respective wing.

12. A glider as defined in claim 2, wherein at least a portion of said vertical component of each of said tailfin means extends from its respective wing tip.

13. A glider as defined in claim 2, wherein a rearward portion of each of said wings comprises finger grip tab means extending rearwardly and inwardly from the main body of the wing, said grip tab means of the respective wings being overlapped in a folded launching configuration of said glider so as to be grippable between fingers for launching the glider.

14. A glider as defined in claim 13 which comprises launching projection means extending downwardly from said root portions of said wings.

15. A glider as defined in claim 2, wherein a rearward portion of each of said wings is upwardly and rearwardly deflected from the general plane of the wing so as to define elevator means,
   said elevator means of each of said wings comprising grip tab means extending rearwardly and inwardly from the main body of the wing, said grip tab means of the respective wings being overlapped in a folded launching configuration of said glider so as to be grippable between fingers for launching the glider.

16. A glider as defined in claim 15 which comprises launching projection means extending downwardly from said root portions of said wings.

17. A glider as defined in claim 2, wherein a rearward portion of each of said wings is upwardly and rearwardly deflected from the general plane of the wing so as to define elevator means.

18. A glider as defined in claim 17, wherein each of said tailfin means extends from said elevator means of its respective wing.

19. A glider as defined in claim 2 which comprises launching projection means extending downwardly from said root portions of said wings.

20. A glider as defined in claim 19, wherein said root portions of said wings are overlapped, and said launching projection means is fixedly secured to the lower of said overlapped wings.

21. A glider as defined in claim 20, wherein said launching projection means extends downwardly from said lower wing in the general form of a pyramid terminating in a launching hook, said pyramid being of open tubular construction with the tube axis oriented so as to be substantially aligned with the direction of flight when said wings are pivoted out to their best glide speed configuration, whereby parasitic drag of said launching projection means is minimized.

22. A glider as defined in claim 19, wherein said launching projection means is proximate said pivotal connection.

23. A glider as defined in claim 22, wherein said launching projection means comprises a downward extension of a pivot member of said pivotal connection.

24. A glider as defined in claim 2, wherein each of said wings is tapered from a relatively wider chord proximate said root portion to a relatively narrower chord proximate said tip portion.

25. A glider as defined in claim 2, wherein said pivotal connection is loose such that said wings are enabled to assume a dihederal deflection during flight.

26. A glider as defined in claim 25, wherein the root edge of the upper of said overlapped wings is substantially straight and is oriented so as to be substantially aligned with the direction of flight when said wings are pivoted out to their best glide speed configuration, whereby relative cocking between said wings is minimized during flight.

27. A glider as defined in claim 2, wherein the trailing edge of each wing proximate its said root portion is concave so as to minimize the wing chord for high aspect ratio.

28. A glider as defined in claim 2, wherein each wing has stiffening rib means thereon proximate said root portion.

29. A glider as defined in claim 28, wherein said stiffening rib means is oriented so as to be substantially aligned with the direction of flight when said wings are pivoted out to their best glide speed configuration.

30. A glider as defined in claim 29, wherein said stiffening rib means on the upper of said overlapped wings extends upwardly therefrom, and said stiffening rib means on the lower of said wings extends downwardly therefrom.

31. A glider as defined in claim 30, wherein said stiffening rib means on each of said wings comprises a pair of parallel ribs substantially equally spaced on opposite sides of said pivotal connection.

32. A glider as defined in claim 17, wherein each wing has stiffening rib means thereon which lies partly on said elevator means and partly on a portion of the wing forward of said elevator means.

33. A glider as defined in claim 32, wherein said stiffening rib means on each wing comprises at least one upwardly extending rib and at least one downwardly extending rib.

34. A glider as defined in claim 33, wherein said stiffening rib means on each wing is oriented generally parallel to said vertical component of its respective tailfin means.

* * * * *